(12) United States Patent
He

(10) Patent No.: US 12,305,020 B2
(45) Date of Patent: May 20, 2025

(54) FLAME RETARDANT AND STABILIZER COMBINED FOR USE WITH THERMOPLASTICS

(71) Applicant: LANXESS Corporation, Pittsburgh, PA (US)

(72) Inventor: Qingliang He, Cheshire, CT (US)

(73) Assignee: LANXESS Corporation, Pittsburgh, PA (US)

( * ) Notice: Subject to any disclaimer, the term of this patent is extended or adjusted under 35 U.S.C. 154(b) by 385 days.

(21) Appl. No.: 18/010,268

(22) PCT Filed: Jun. 16, 2021

(86) PCT No.: PCT/US2021/037716
§ 371 (c)(1),
(2) Date: Dec. 14, 2022

(87) PCT Pub. No.: WO2021/257756
PCT Pub. Date: Dec. 23, 2021

(65) Prior Publication Data
US 2023/0227630 A1    Jul. 20, 2023

Related U.S. Application Data

(60) Provisional application No. 63/040,489, filed on Jun. 17, 2020.

(51) Int. Cl.
*C08K 5/5317* (2006.01)
*C08K 5/1515* (2006.01)
*C09K 21/12* (2006.01)

(52) U.S. Cl.
CPC .......... *C08K 5/5317* (2013.01); *C08K 5/1515* (2013.01); *C09K 21/12* (2013.01)

(58) Field of Classification Search
CPC ....... C08K 5/5317; C08K 5/0066; C08F 9/38; C08F 9/3895
See application file for complete search history.

(56) References Cited

U.S. PATENT DOCUMENTS

| | | | |
|---|---|---|---|
| 3,689,602 A | 9/1972 | Ismail | |
| 3,894,986 A | 7/1975 | Racky et al. | |
| 4,859,466 A | 8/1989 | Maier et al. | |
| 4,972,011 A | 11/1990 | Richardson et al. | |
| 5,053,148 A | 10/1991 | von Bonin | |
| 5,780,534 A | 7/1998 | Kleiner et al. | |
| 6,013,707 A | 1/2000 | Kleiner et al. | |
| 6,184,405 B1 | 2/2001 | Kleiner et al. | |
| 6,255,371 B1 | 7/2001 | Schlosser et al. | |
| 6,365,071 B1 | 4/2002 | Jenewein et al. | |
| 6,472,448 B2 | 10/2002 | Witte et al. | |
| 6,547,992 B1 | 4/2003 | Schlosser et al. | |
| 7,255,814 B2 | 8/2007 | Hoerold et al. | |
| 8,889,773 B2 | 11/2014 | Zilberman et al. | |
| 9,475,933 B2 | 10/2016 | Shetkler et al. | |
| 9,534,108 B2 | 1/2017 | Timberlake et al. | |
| 9,534,109 B2 | 1/2017 | Hoerold et al. | |
| 9,745,449 B2 | 8/2017 | Stockdale et al. | |
| 9,752,009 B2 | 9/2017 | Stockdale et al. | |
| 9,752,011 B2 | 9/2017 | Stockdale et al. | |
| 9,758,640 B2 | 9/2017 | Stockdale et al. | |
| 9,765,204 B2 | 9/2017 | Timberlake et al. | |
| 11,993,622 B2 * | 5/2024 | Bonyhady | C07F 9/3808 |
| 2006/0135391 A1 | 6/2006 | Scheibel et al. | |
| 2007/0029532 A1 | 2/2007 | Hansel et al. | |
| 2015/0031805 A1 | 1/2015 | Stockdale et al. | |
| 2015/0307690 A1 | 10/2015 | Timberlake et al. | |
| 2016/0032076 A1 | 2/2016 | Stockdale et al. | |
| 2016/0281001 A1 | 9/2016 | Butz | |
| 2018/0135239 A1 | 5/2018 | Rapaport et al. | |
| 2019/0016853 A1 | 1/2019 | Neuwald et al. | |
| 2019/0153197 A1 | 5/2019 | Krause et al. | |
| 2022/0073547 A1 | 3/2022 | Bonyhady et al. | |
| 2024/0117252 A1 * | 4/2024 | Lee | C07F 9/3895 |

FOREIGN PATENT DOCUMENTS

| | | |
|---|---|---|
| CN | 107189427 A | 9/2017 |
| CN | 106632468 B2 | 8/2019 |
| DE | 19920276 A1 | 11/2000 |
| DE | 102010053483 A1 | 6/2012 |
| DE | 102017215779 A1 | 3/2019 |
| EP | 2479181 A1 | 7/2012 |
| WO | 2020132075 A3 | 10/2020 |
| WO | 2021076169 A1 | 4/2021 |

OTHER PUBLICATIONS

International Search Report from corresponding International Application No. PCT/US2021/037716, dated Oct. 1, 2021, two pages.

* cited by examiner

*Primary Examiner* — Brieann R Johnston
(74) *Attorney, Agent, or Firm* — Nicanor A. Kohncke; Christopher L. McDavid; Alyson J. DiLena

(57) ABSTRACT

The present disclosure relates to a novel flame retardant and stabilizer additive composition for thermoplastic polymers, the additive composition including at least one phosphorus-containing flame retardant and at least one epoxide, as described herein. The presently disclosed additive compositions are useful over a wide range of thermoplastic applications, particularly in thermoplastic polymers that are processed and/or used at high temperatures.

20 Claims, 2 Drawing Sheets

FLAME RETARDANT AND STABILIZER COMBINED FOR USE WITH THERMOPLASTICS

The present disclosure relates to a flame retardant and stabilizer additive composition for thermoplastic polymers and to flame retardant thermoplastic compositions comprising the flame retardant and stabilizer combined.

During melt processing of thermoplastics, a variety of additives are often added, serving various purposes, e.g., antioxidants, lubricants, stabilizers, flame retardants, etc. While essential for providing flame retardancy to thermoplastics, flame retardant additives can impact the stability of thermoplastics during melt processing, such as by increasing polymer degradation and/or discoloration. For example, these types of effects have been discussed and reported in the literature for certain phosphorus-containing flame retardants, such as described in U.S. Pat. Nos. 7,255,814 and 9,534,109 for phosphinate flame retardants.

The present disclosure provides a novel phosphorus-containing flame retardant and stabilizer additive composition for thermoplastic polymers. The phosphorus containing flame retardants of the present disclosure, which are also described in the present Applicant's co-pending patent application nos. PCT/US2019/067184 and PCT/US2019/067230, provide the additional benefit of being compounded into thermoplastic polymers at high temperatures, such as high temperature polyamides and polyterephthalate esters, without decomposing due to the high thermal stability of these phosphorus-containing flame retardants. The presently disclosed additive compositions are therefore useful over a wide range of thermoplastic applications, particularly in thermoplastic polymers that are processed and/or used at high temperatures.

In particular, the present disclosure provides a flame retardant and stabilizer additive composition, for thermoplastic polymers, comprising (A) at least one phosphorus-containing flame retardant of empirical formula (I):

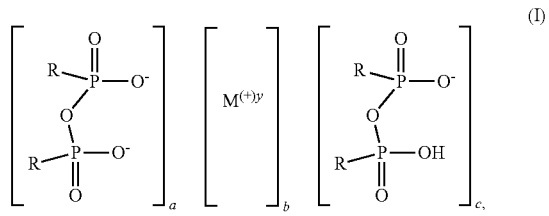

(I)

wherein R is H, an alkyl, aryl, alkylaryl, or arylalkyl group, M is a metal and y is 2 or 3, such that $M^{(+)y}$ is a metal cation where (+)y represents the charge formally assigned to the cation, a, b, and c represent the ratio of the components to which they correspond relative to one another in the compound, and satisfy the charge-balance equation $2(a)+c=b(y)$, and c is not zero, and (B) at least one epoxide compound. The epoxide compound preferably has at least two epoxide groups. In many embodiments, at least one epoxide group is terminal.

The flame retardant and stabilizer additive composition may further comprise (C) at least one flame retardant synergist and/or additional flame retardant. The additive composition may additionally comprise (D) one or more other stabilizers.

The present disclosure further provides a flame retardant thermoplastic composition comprising (i) at least one thermoplastic polymer,
(ii) at least one phosphorus-containing flame retardant of empirical formula (I) above, and
(iii) at least one epoxide compound, as above. The flame retardant thermoplastic composition may further comprise (iv) at least one inorganic filler (e.g., glass fiber), (v) at least one flame retardant synergist and/or additional flame retardant, (vi) one or more additional stabilizers, and/or (vii) one or more further additives to enhance the properties of the thermoplastic composition.

The preceding summary is not intended to restrict in any way the scope of the claimed invention. In addition, it is to be understood that both the foregoing general description and the following detailed description are exemplary and explanatory only and are not restrictive of the invention, as claimed.

DETAILED DESCRIPTION

Figure 1:
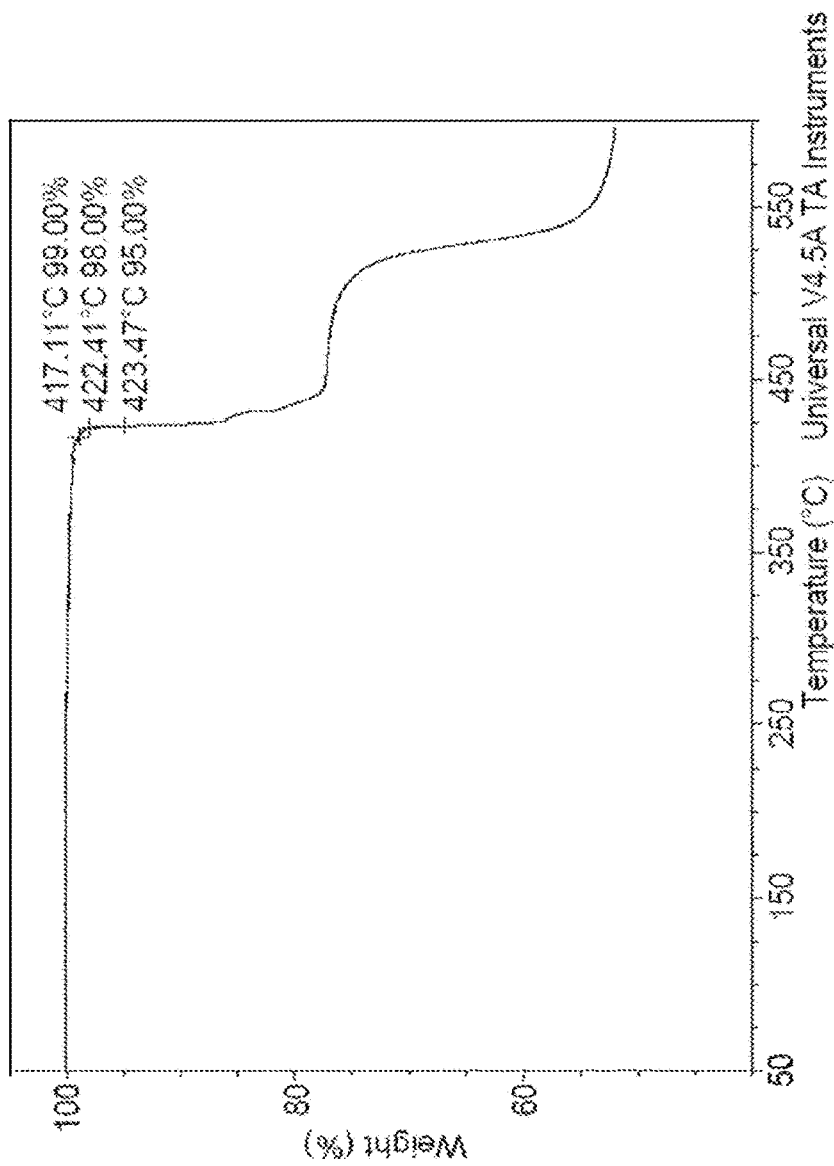
FIG. 1 shows the result of thermogravimetric analysis (TGA) of an exemplary phosphorus-containing flame retardant produced according to Example 1 of the present disclosure.

Unless otherwise specified, the word "a" or "an" in this application means "one or more than one".

The term "alkyl" in this application includes "arylalkyl," unless the context dictates otherwise.

The term "aryl" in this application includes "alkylaryl," unless the context dictates otherwise.

The term "phosphonic acid" as used herein refers to unsubstituted or alkyl or aryl substituted phosphonic acid, unless the context dictates otherwise.

The term "pyrophosphonic acid" as used herein refers to unsubstituted or alkyl or aryl substituted pyrophosphonic acid, unless the context dictates otherwise.

As described above, the present disclosure provides a novel phosphorus-containing flame retardant and stabilizer additive composition for thermoplastic polymers.

The present disclosure provides a flame retardant and stabilizer additive composition, for thermoplastic polymers, comprising (A) at least one phosphorus-containing flame retardant of empirical formula (I):

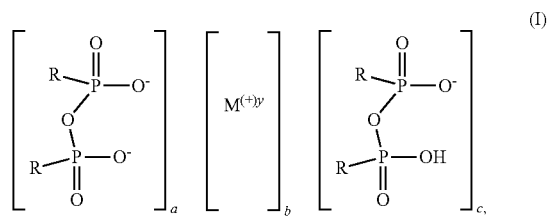

(I)

wherein R is H, an alkyl, aryl, alkylaryl, or arylalkyl group, M is a metal and y is 2 or 3, such that M is a metal cation where (+)y represents the charge formally assigned to the cation, a, b, and c represent the ratio of the components to which they correspond relative to one another in the compound, and satisfy the charge-balance equation 2(a)+c=b(y), and c is not zero, and (B) at least one epoxide compound.

The at least one phosphorus-containing flame retardant of the present disclosure (component (A)) has the following empirical formula:

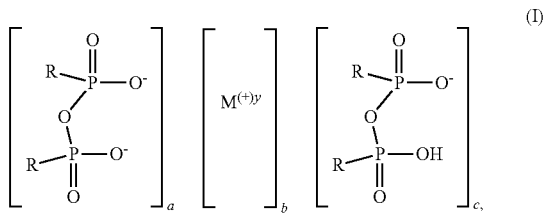

wherein R is H, an alkyl, aryl, alkylaryl, or arylalkyl group, M is a metal and y is 2 or 3, such that $M^{(+)y}$ is a metal cation where (+)y represents the charge formally assigned to the cation, a, b, and c represent the ratio of the components to which they correspond relative to one another in the compound, and satisfy the charge-balance equation 2(a)+c=b(y), and c is not zero. Often, a is 0, 1, or 2 (e.g., 0 or 1), b is from 1 to 4, e.g., 1 or 2, and c is 1 or 2, and the product is charged balanced. Examples of suitable metals (M) include, but are not limited to, Al, Ga, Sb, Fe, Co, B, Bi, Mg, Ca, and Zn.

As is common with inorganic coordination compounds, formula (I) is empirical or idealized such that the compounds may be coordination polymers, complex salts, salts where certain atomic valences are shared, etc. For example, in many embodiments, empirical formula (I) represents a monomer unit (i.e., coordination entity) of a coordination polymer, the extended coordination polymer structure thereby forming the phosphorus-containing flame retardant of the present disclosure.

In certain embodiments, y in formula (I) is 2 (i.e., $M^{(+)y}$ is a di-cationic metal), a is 0, b is 1, and c is 2. In certain embodiments, the di-cationic metal M is Mg, Ca, or Zn. In other embodiments, y in formula (I) is 3 (i.e., $M^{(+)y}$ is a tri-cationic metal), a is 1, b is 1, and c is 1. In certain embodiments, the tri-cationic metal M is chosen from Al, Ga, Sb, Fe, Co, B, and Bi. In certain embodiments, the tri-cationic metal M is Al, Fe, Ga, Sb, or B.

In one example, M is Al and y is 3 and the phosphorus-containing flame retardant has the following empirical formula:

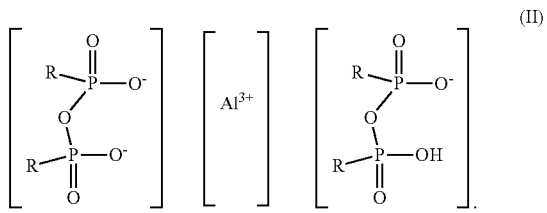

As shown herein, the absence of subscripts a, b and c in an empirical formula indicates that the subscripts are each 1, signifying a 1:1:1 ratio of the di-anionic pyrophosphonic acid ligand, metal atom, and mono-anionic pyrophosphonic acid ligand. In many embodiments, empirical formula (II) represents a repeating monomer unit (i.e., coordination entity) of a coordination polymer, the extended coordination polymer structure thereby forming the phosphorus-containing flame retardant of the present disclosure.

Often, R is H, $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl. In some embodiments, said alkyl, aryl, alkylaryl, or arylalkyl are unsubstituted $C_{1-12}$ alkyl, $C_6$ aryl, $C_{7-10}$ alkylaryl, or $C_{7-10}$ arylalkyl, for example, $C_{1-6}$ alkyl, phenyl, or $C_{7-9}$ alkylaryl. In some embodiments, R is substituted or unsubstituted $C_{1-6}$ alkyl, $C_6$ aryl, $C_{7-10}$ alkylaryl, or $C_{7-12}$ arylalkyl, e.g., $C_{1-4}$ alkyl, $C_6$ aryl, $C_{7-9}$ alkylaryl, or $C_{7-10}$ arylalkyl. In many embodiments, R is unsubstituted $C_{1-12}$ alkyl, e.g., $C_{1-6}$ alkyl. In many embodiments, lower alkyl phosphonic acids are used, e.g., methyl-, ethyl-, propyl-, isopropyl-, butyl-, t-butyl- and the like.

R as alkyl may be a straight or branched chain alkyl group having the specified number of carbons and includes e.g., unbranched alkyls such as methyl, ethyl, propyl, butyl, pentyl, hexyl heptyl, octyl, nonyl, decyl, undecyl, dodecyl, and branched alkyl such as isopropyl, isobutyl, sec-butyl, t-butyl, ethyl hexyl, t-octyl and the like. For example, R as alkyl may be chosen from methyl, ethyl, propyl, isopropyl, butyl, isobutyl, sec-buty, and t-butyl. In many embodiments, R is methyl, ethyl, propyl or isopropyl, for example methyl or ethyl.

Often, when R is aryl it is phenyl. Examples of R as alkylaryl include phenyl substituted by one or more alkyl groups, for example groups selected from methyl, ethyl, propyl, isopropyl, butyl, isobutyl, sec-buty, t-butyl, and the like. Examples of R as arylalkyl, include for example, benzyl, phenethyl, styryl, cumyl, phenpropyl and the like.

In many embodiments, R is chosen from methyl, ethyl, propyl, isopropyl, butyl, phenyl and benzyl. In certain embodiments, R is methyl, ethyl, propyl, isopropyl or butyl and M is Al, Fe, Zn or Ca.

The phosphorus-containing flame retardant of the present disclosure can be a mixture of compounds of empirical formula (I).

The phosphorus-containing flame retardant of the present disclosure has a high phosphorus content (i.e., a higher ratio of phosphorus atoms to metal atoms (P to M)) as compared to phosphorus-containing flame retardants described in the art. For example, tri-cationic metals (e.g., aluminum) and di-cationic metals (e.g., zinc) are known to form tri-substituted and di-substituted charge balanced compounds, respectively. As seen in the art, tris-phosphonate aluminum salts—having a phosphorus to aluminum ratio of 3:1—and di-phosphonate zinc salts—having a phosphorus to zinc ratio of 2:1—are known as flame retardants. However, in accordance with the pyrophosphonic acid ligand formation of the present disclosure, the ratio of phosphorus to metal in the flame retardant product is higher. For example, as demonstrated in the Examples disclosed herein, the ratio of phosphorus to aluminum, or the ratio of phosphorus to iron, in the resulting flame retardant product was 4:1.

Regarding component (B), epoxide compounds are known and can be produced according to known processes, such as described in US Patent Publication US 2019/0016853 A1. The epoxide compound preferably has at least two epoxide groups. In many embodiments, at least one epoxide group is terminal. Often the epoxide compound has two terminal epoxide groups. The epoxide compound can contain aromatic and/or aliphatic moieties. Often the epoxide compound is an aromatic epoxide compound, such as an aromatic epoxide compound having two terminal epoxide groups.

The epoxide compound may have an epoxy equivalent weight of no more than 2000, such as no more than 1000, for example 100-1000, grams per equivalent. The epoxy equivalent weight (EEW) is defined as the weight of the epoxide compound in grams which contains one gram-equivalent of epoxy.

Preferred epoxide compounds include polyglycidyl or poly(beta-methylglycidyl) ethers, preferably obtainable by reacting a compound having at least two free alcoholic or phenolic hydroxyl groups and/or by reaction of phenolic hydroxyl groups with a substituted epichlorohydrin.

For example, polyglycidyl or poly(beta-methylglycidyl) ethers may derive from acyclic alcohols, such as alkylene glycols or polyoxyalkylene glycols, e.g., ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, and hexane-1,6-diol, hexane-2,4,6-triol, glycerol, 1,1,1-trimethylpropane, bistrimethylolpropane, pentaerythritol, sorbitol, or from polyepichlorohydrins.

Alternatively preferred polyglycidyl or poly(beta-methylglycidyl) ethers derive from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they comprise aromatic nuclei based on N,N-bis(-8, 2-hydroxyethyl)aniline or p,p'-bis(2-hydroxyethylamino)diphenylmethane.

Preferred epoxide compound may be also based on monocyclic phenols (e.g., resorcinol or hydroquinone) or polycyclic phenols (such as bis(4-hydroxyphenyl)methane, 2,2-bis(4-hydroxyphenyl)propane, 2,2-bis(3,5-dibromo-4-hydroxyphenyl)propane or 4,4'-dihydroxydiphenylsulphone) or may derive from condensation products of alcohols (e.g., phenols) with formaldehyde, such as phenolic novolacs. Exemplary phenolic novolacs include, without limitation, cresol novolacs, bisphenol A novolacs, and bisphenol F novolacs.

In some embodiments, the epoxide compound is a phenolic novolac polyglycidyl ether of the formula (III):

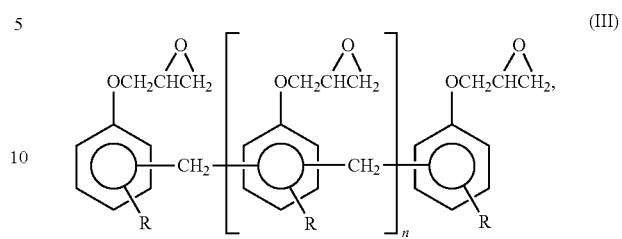

where R in formula (III) is independently chosen from the group consisting of hydrogen, halogen, alkyl, alkoxy, aryl, alkylaryl and aralkyl, and n is 0 to 1000, such as from 0 to 100, where n represents the average number. In many embodiments, the alkyl contains from 1 to 10 carbon atoms. In some embodiments, the alkyl and/or alkoxy contains from 1 to 4 carbon atoms. In some embodiments, n is from 0 to 10, such as from 1 to 8, from 1 to 6 or from 2 to 3, where n represents the average number. In particular embodiments, R is alkyl (e.g., methyl).

Preferred phenol-type novolacs are cresol novolacs (meta-, para- and ortho-cresol novolacs). One example of a preferred aromatic epoxide compound having two terminal epoxide groups is a polyglycidyl ether of cresol novolac, preferably ortho cresol novolac. In many embodiments, the polyglycidyl ether of cresol novolac has an epoxy equivalent weight (according to ASTM D 1652) in the range from 100 to 600 grams per equivalent, such as in the range from 150 to 500 grams per equivalent or from 180 to 250 grams per equivalent. In particular embodiments, the at least one epoxide compound is of the formula (IV):

(IV)

where n is from 0 to 1000, such as from 0 to 100 (e.g., from 0 to 10, from 1 to 8, from 1 to 6 or from 2 to 3), wherein n represents the average number.

Another example of a preferred aromatic epoxide compound having two terminal epoxide groups is an oligomeric reaction product of bisphenol A with epichlorohydrin as represented by formula (V):

(V)

where a is 0 to 1000, such as from 0 to 100 (e.g., from 0 to 10, from 1 to 8, from 1 to 6 or from 2 to 3), wherein a represents the average number. In particular embodiments, the oligomeric reaction of bisphenol A with epichlorohydrin as described above has an epoxy equivalent weight (according to ASTM D1652) in the range from 450 to 600 grams per equivalent.

In many embodiments, the at least one epoxide compound has a melting point according to ASTM D3461 in the range from 0 to 160° C., such as 50° C. to 120° C., from 60° C. to 110° C. or from 70° C. to 90° C.

The flame retardant and stabilizer additive composition may further comprise at least one flame retardant synergist and/or additional flame retardant (component (C)). Examples of suitable flame retardant synergists include condensation products of melamine (e.g., melam, melem, melon), melamine cyanurate, reaction products of melamine with polyphosphoric acid (e.g., dimelamine pyrophosphate, melamine polyphosphate), reaction products of condensation products of melamine with polyphosphoric acid (e.g., melem polyphosphate, melam polyphosphate, melon polyphosphate), melamine☐poly(metal phosphate) (e.g., melamine-poly(zinc phosphate), a triazine-based compound, such as a reaction product of trichlorotriazine, piperazine and morpholine, e.g., poly-[2,4-(piperazine-1,4-yl)-6-(morpholine-4-yl)-1,3,5-triazine]/piperazin (e.g., MCA® PPM Triazine HF), a metal hypophosphite, such as aluminum hypophosphite (e.g., Italmatch Phoslite® IP-A), an organic phosphinate, such as aluminum dialkylphosphinate, e.g., aluminum diethylphosphinate (Exolit OP). In many embodiments, a nitrogen-containing synergist is used. Suitable nitrogen-containing synergists may be chosen from, e.g., melamine derivatives such as melamine and its condensation products (melam, melem, melon or similar compounds with higher condensation levels), melamine cyanurate, and phosphorus/nitrogen compounds such as dimelamine phosphate, dimelamine pyrophosphate, melamine phosphate, melamine pyrophosphate, melamine polyphosphate, melam polyphosphate, melon polyphosphate, and melem polyphosphate, and mixed polysalts thereof. Examples of additional flame retardants suitable for the present flame retardant and stabilizer additive composition include halogenated flame retardants, alkyl or aryl phosphine oxide flame retardants, alkyl or aryl phosphate flame retardants, alkyl or aryl phosphonates, alkyl or aryl phosphinates, and salts of alkyl or aryl phosphinic acid.

The additive composition may additionally comprise one or more other stabilizers (component (D)). Examples of suitable additional stabilizers include metal hydroxides, oxides, oxide hydrates, borates, molybdates, carbonates, sulfates, phosphates, silicates, siloxane, stannates, mixed oxide-hydroxides, oxide-hydroxide-carbonates, hydroxide-silicates, hydroxide-borates, preferably where the metal is zinc, magnesium, calcium or manganese, often zinc. In many embodiments, an additional stabilizer is chosen from zinc borate, zinc stannate, zinc molybdate complex (e.g., Kemgard 911B), zinc molybdate/magnesium hydroxide complex (e.g., Kemgard MZM), zinc molybdate/magnesium silicate complex (Kemgard 911C), calcium molybdate/zinc complex (e.g., Kemgard 911A), and zinc phosphate complex (e.g., Kemgard 981), polysiloxane, montmorillonite, kaolinite, halloysite, and hydrotalcite.

The quantitative proportions of the components (A), (B), (C) and (D) in the flame retardant and stabilizer additive composition may vary and generally depend on, e.g., the intended application, processing conditions, etc. In many embodiments, the flame retardant and stabilizer additive composition comprises from 40 to 99.9 wt %, such as from 50 to 95 wt % or from 50 to 80 wt % of the at least one phosphorus-containing flame retardant (A), from 0.1 to 10 wt %, such as from 0.5 to 5 wt %, of the at least one epoxide (B), from 0 to 80 wt %, such as from 10 to 60 wt % or from 20 to 50 wt % of the at least one flame retardant synergist and/or additional flame retardant (C), and from 0 to 35 wt %, such as from 0 to 10 wt %, of the one or more other stabilizers (D), all based on the total weight of the additive composition.

The present disclosure further provides a flame retardant thermoplastic composition comprising
(i) at least one thermoplastic polymer,
(ii) at least one phosphorus-containing flame retardant of empirical formula (I) above, and
(iii) at least one epoxide, as described above. The flame retardant thermoplastic composition may further comprise (iv) at least one inorganic filler (e.g., glass fiber), (v) at least one flame retardant synergist and/or additional flame retardant, (vi) one or more additional stabilizers, and/or (vii) one or more further additives to enhance the properties of the thermoplastic composition.

The at least one thermoplastic polymer (i) is often present in the flame retardant thermoplastic composition in an amount of from 30 to 95 wt %, such as from 40 to 90 wt % or from 50 to 90 wt %, based on the total weight of the flame retardant thermoplastic composition. The at least one thermoplastic polymer may be a thermoplastic polyester, polyamide, polystyrene, including high impact polystyrene (HIPS), polyolefin, polycarbonate, polyurethane, polyphenylene ether, or other thermoplastic polymer. In many embodiments, the thermoplastic polymer comprises a polyester (e.g., a polyalkylene terephthalate) or polyamide. In many embodiments, the thermoplastic polymer comprises a polyamide. More than one thermoplastic polymer (thermoplastic polymer blends) can be used, such as polyphenylene ether/styrenic resin blends, polyvinyl chloride/acrylonitrile butadiene styrene (ABS) or other impact modified polymers, such as methacrylonitrile and α-methylstyrene containing ABS, and polyester/ABS or polycarbonate/ABS. The thermoplastic polymer may be unreinforced or reinforced, for example, glass reinforced, such as a glass-filled polyester (e.g., glass-filled polyalkylene terephthalate) or a glass-filled polyamide.

Examples of thermoplastic polyesters include homopolyesters and copolyesters obtained by polycondensation of an acid component and a diol component. For example, suitable polyesters may be chosen from polybutylene terephthalate and polyethylene terephthalate.

The diol component may contain one or more of the following glycols: ethylene glycol, trimethylene glycol, 2-methyl-1,3-propane glycol, 1,4-butylene glycol, hexamethylene glycol, decamethylene glycol, cyclohexane dimethanol, or neopentylene glycol. The acid component may contain one or more of the following acids: terephthalic acid, isophthalic acid, 2,6-naphthalenedicarboxylic acid, 2,7-naphthalenedicarboxylic acid, 1,5-naphthalenedicarboxylic acid, 4,4'-diphenyldicarboxylic acid, 4,4'-diphenoxyethandicarboxylic acid, p-hydroxybenzoic acid, sebacic acid, adipic acid and polyester-forming derivatives thereof.

In many embodiments, the thermoplastic polyester is chosen from poly(ethylene terephthalate), poly(1,3-trimethylene terephthalate), poly(1,4-butyleneterephthalate), and blends thereof. For example, thermoplastic polyester blends can comprise from about 1 to about 99 parts by weight of one polyester and from about 99 to about 1 part by weight of a different polyester based on 100 parts by weight of both components combined. The poly(1,4-butylene terephthalate) may be one obtained by polymerizing a diol component which is comprised of at least 70 mol %, e.g., at least 80 mol %, of 1,4-butylene glycol, with an acid component which is comprised of at least 70 mol %, e.g., at least 80 mol %, of terephthalic acid and/or polyester-forming derivatives thereof.

Thermoplastic polyamides include polyamides derived from a diamine and a dicarboxylic acid, polyamides obtained from an aminocarboxylic acid, including in combination with a diamine and/or a dicarboxylic acid, and polyamides derived from a lactam, including in combination with a diamine and/or a dicarboxylic acid. Examples of suitable polyamides include aliphatic polyamides such as polyamide-4,6, polyamide-6, polyamide-6,6, polyamide-6, 10, polyamide-6,12, polyamide-11 and polyamide-12; polyamides obtained from an aromatic dicarboxylic acid, such as terephthalic acid and/or isophthalic acid, and an aliphatic diamine, such as a hexamethylenediamine or nonamethylenediamine; polyamides obtained from aliphatic dicarboxylic acids, such as adipic acid and/or azelaic acid, and aromatic diamines, such as meta-xylylenediamine; polyamides obtained from both aromatic and aliphatic dicarboxylic acids, such as both terephthalic acid and adipic acid, and an aliphatic diamine, such as hexamethylenediamine; polyamides obtained from adipic acid, azelaic acid, and 2,2-bis-(p-aminocyclohexyl)propane; and polyamides obtained from terephthalic acid and 4,4'-diaminodicyclohexylmethane. Mixtures and/or copolymers of two or more of the foregoing polyamides or prepolymers thereof, respectively, may also be used.

The polyamides may be made by any known method, such as via polymerization of a monoaminomonocarboxylic acid or a lactam thereof having at least two carbon atoms between the amino and carboxylic acid group, of substantially equimolar proportions of a diamine which contains at least two carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, a salt, an ester or acid chloride.

Polyamides with melting points of at least 280° C. are used extensively for producing molding compositions which make possible the production of molded articles, e.g. for the electrical and electronics industry, with excellent dimensional stability at high temperatures and with very good flame-retardant properties. Molding compositions of this type are demanded for example in the electronics industry for producing components which are mounted on printed circuit boards according to the so-called surface mounting technology, SMT. In this application, these components must withstand temperatures of up to 270° C. for short periods of time without dimensional change.

Such high temperature polyamides include certain polyamides produced from alkyl diamines and diacids, such as polyamide 4,6. Further, many high temperature polyamides are aromatic and semi-aromatic polyamides, i.e., homopolymers, copolymers, terpolymers, or higher polymers that are derived from monomers containing aromatic groups. An aromatic or semi-aromatic polyamide may be employed or blends of aromatic and/or semi-aromatic polyamides may be used. Blends with aliphatic polyamides may also be used.

Examples of suitable high temperature aromatic or semi-aromatic polyamides include polyamide-4,T, poly(m-xylylene adipamide) (polyamide-MXD,6), poly(dodecamethylene terephthalamide) (polyamide-12,T), poly(decamethylene terephthalamide) (polyamide-10,T), poly(nonamethylene terephthalamide) (polyamide-9,T), hexamethylene adipamide/hexamethylene terephthalamide copolyamide (polyamide-6,T/6,6), hexamethylene terephthalamide/2-methylpentamethylene terephthalamide copolyamide (polyamide-6,T/D,T); hexamethylene adipamide/hexamethylene terephthalamide/hexamethylene isophthalamide copolyamide (polyamide-6,6/6,T/6,I); poly(caprolactam-hexamethylene terephthalamide) (polyamide-6/6,T); hexamethylene terephthalamide/hexamethylene isophthalamide (polyamide-6,T/6,I) copolymer; and the like.

Certain embodiments of the invention are thus to compositions comprising a polyamide that melts at high temperatures, e.g., 280° C. or higher, 300° C., or higher, or 320° C. or higher. In some embodiments, the polyamide has a melting temperature from 280 to 340° C., such as polyamide 4,6 or the aromatic and semi-aromatic polyamides described above.

Preferred polyamides are polyamide-6, polyamide-6,6, polyamide-11, polyamide-12, polyphthalamides, such as polyamide-4,T, polyamide-6,T/6,6, and polyamide-6,6/6,T/6,I copolymers, glass-filled polyamides thereof, and blends thereof. For example, thermoplastic polyamide blends can comprise from about 1 to 99 parts by weight of one polyamide and from about 99 to about 1 part by weight of a different polyamide based on 100 parts by weight of both components combined.

In some embodiments, the polymer is a thermoplastic elastomer (e.g., thermoplastic polyolefins or thermoplastic polyurethanes). In some embodiments, the thermoplastic elastomer is a thermoplastic polyurethane.

The at least one phosphorus-containing flame retardant (ii) is as described above and is present in the flame retardant thermoplastic composition in a flame retardant effective amount. Often, the presently disclosed phosphorus-containing flame retardant is present in an amount of from 1 to 30 wt %, such as 3 to 25 wt %, based on the total weight of the flame retardant thermoplastic composition.

The at least one epoxide compound (iii) in the flame retardant thermoplastic composition is as described above and is often present in the flame retardant thermoplastic composition in an amount of from 0.01 or 0.1 to 2 wt %, such as from 0.01 or 0.1 to 1 wt %, from 0.1 to 0.5 wt % or from 0.1 to 0.3 wt %, based on the total weight of the composition.

At least one inorganic filler (iv) may be present in the flame retardant thermoplastic composition. As known in the art, an inorganic filler can reduce the molding shrinkage coefficient and linear expansion coefficient of a resultant molded article and improve high and low heat shock property. Various fillers in the form of fiber or non-fiber (e.g., powder, plate) may be used depending on the desired article. Some examples of fibrous filler, which are types of inorganic filler, may be those such as, glass fiber, glass fiber having a non-circular cross section, such as flat fiber, carbon fiber, silica fiber, silica alumina fiber, zirconia fiber, boron nitride fiber, silicon nitride fiber, boron fiber, potassium titanate fiber, and further, metal fibrous substances such as stainless, aluminum, titanium, copper and brass. Typical fibrous filler is glass fiber or carbon fiber. Alternatively, the inorganic filler may be a powdery filler, such as carbon black, graphite, silica, quartz powder, glass bead, glass powder, calcium silicate, kaolin, talc, clay, diatomaceous earth, silicates, such as wollastonite, metal oxides, such as iron oxide, titanium oxide, zinc oxide and alumina, metal hydroxides, metal carbonates, such as calcium carbonate and magnesium carbonate, metal sulfates, such as calcium sulfate and barium sulfate, silicon carbide, silicon nitride, boron nitride and various metal powders. Another example of inorganic filler is plate-like filler such as mica, glass flake and various metal foils. These inorganic fillers can be used alone or in combination of two or more. In use, the inorganic fillers are desirably treated previously with a sizing agent or surface treatment agent, if necessary.

When present, the amount of the at least one inorganic filler in the flame retardant thermoplastic composition is often from 1 to 50 wt %, e.g., from 5 to 50 wt %, from 10 to 40 wt %, or from 15 to 30 wt %, based on the total weight of the flame retardant thermoplastic composition.

The flame retardant thermoplastic composition may further comprise at least one flame retardant synergist and/or additional flame retardant (v). Exemplary flame retardant synergists and additional flame retardants are described above. When present, the amount of the at least one flame retardant synergist and/or additional flame retardant (v) is often from 1 to 25 wt %, such as from 5 to 25 wt %, based on the total weight of the flame retardant thermoplastic composition.

The flame retardant thermoplastic composition may further comprise at least one additional stabilizer (vi). Exemplary additional stabilizers are as described above. When present, the amount of the at least one additional stabilizer is often from 0.01 to 5 wt %, based on the total weight of the flame retardant thermoplastic composition.

Other ingredients or additives (vi) may be present in the flame retardant thermoplastic composition and are typically employed in amounts less than 10 percent by weight of the flame retardant thermoplastic composition, e.g., less than 5 percent by weight, and include non-limiting examples such as antioxidants, UV stabilizers, lubricants, impact modifiers, other stabilizers or acid scavengers, heat stabilizers, plasticizers, pigments, dyes, optical brighteners, anti-static agents, anti-dripping agents, e.g. PTFE, and other additives used to enhance the properties of the resin.

In many embodiments, the flame retardant thermoplastic composition comprises the at least one thermoplastic polymer (i) in an amount of from 30 to 95 wt %, the at least one phosphorus-containing flame retardant (ii) in an amount of from 1 to 30 wt %, the at least one epoxide (iii) in an amount of from 0.01 to 2 wt %, the at least one inorganic filler (iv) in an amount of from 0 to 50 wt %, and the at least one flame retardant synergist and/or additional flame retardant (v) in an amount of from 0 to 25 wt %, all based on the total weight of the flame retardant thermoplastic composition. In many embodiments, the flame retardant thermoplastic composition comprises the at least one thermoplastic polymer (i) in an amount of from 40 to 90 wt %, the at least one phosphorus-containing flame retardant (ii) in an amount of from 3 to 25 wt %, and the at least one epoxide in an amount of from 0.1 to 1 wt %, the at least one inorganic filler (iv) in an amount of from 0 to 50 wt %, such as from 10 to 40 wt %, the at least one flame retardant synergist and/or additional flame retardant (v) in an amount of from 0 to 25 wt %, such as from 5 to 25 wt %, all based on the total weight of the flame retardant thermoplastic composition. In some embodiments, the composition further comprises at least one additional stabilizer (vi) in an amount of from 0 to 5 wt %, such as from 0.01 to 5 wt %, based on the total weight of the flame retardant thermoplastic composition.

The phosphorus-containing flame retardant of empirical formula (I) may be prepared by a process referred to herein as the solvent method or by a process referred to herein as the molten state method.

Preparing the Phosphorus-Containing Flame Retardant Via the Solvent Method

The phosphorus-containing flame retardant of empirical formula (I) may be prepared by reacting a metal or suitable metal compound with an unsubstituted or alkyl or aryl substituted phosphonic acid. The process includes (i) preparing a reaction mixture, the reaction mixture comprising (a) an unsubstituted or alkyl or aryl substituted phosphonic acid, (b) a solvent for the phosphonic acid, and (c) a metal or suitable metal compound; and (ii) heating or reacting the reaction mixture at a reaction temperature of 105° C. or higher for an amount of time sufficient to produce the phosphorus-containing flame retardant. In the reaction, the metal is oxidized and may be represented in its corresponding cationic form by the formula $M^{(+)y}$ where M is a metal, (+)y represents the charge of the metal cation, and y is 2 or 3. The suitable metal compound may be represented by the formula $M_p^{(+)y}X_q$, where M is a metal, (+)y represents the charge of the metal cation, y is 2 or 3, X is an anion, and the values for p and q provide a charge balanced metal compound.

In another embodiment, the phosphorus-containing flame retardant may be prepared by reacting a metal or suitable metal compound with an unsubstituted or alkyl or aryl substituted pyrophosphonic acid. The process includes (i) preparing a reaction mixture, the reaction mixture comprising (a) an unsubstituted or alkyl or aryl substituted pyrophosphonic acid, (b) a solvent for the pyrophosphonic acid, and (c) a metal or suitable metal compound as above; and (ii) heating or reacting the reaction mixture at a reaction temperature of 20° C. or higher for an amount of time sufficient to produce the phosphorus-containing flame retardant.

The reaction product typically forms as a slurry as the resulting phosphorus-containing flame retardant product precipitates from the reaction mixture. Phosphonic acid, pyrophosphonic acid, and/or solvent remaining after the reaction can be removed along with any possible byproducts by filtration and/or washing, e.g., with water. In many embodiments, a substantially pure flame retardant material is produced, e.g., a flame retardant comprising essentially a single compound with flame retardant activity or essentially a mixture of active compounds. Conversion based on the metal or metal compound is typically high, and the product can be readily isolated and optionally further purified if desired.

Typically, the molar ratio of the phosphonic or pyrophosphonic acid to the metal or suitable metal compound in the reaction mixture is higher than 2:1, such as about 3:1 or higher, about 4:1 or higher, about 5:1 or higher, about 6:1 or higher, about 7:1 or higher, or about 8:1 or higher. Often larger molar excesses of the phosphonic or pyrophosphonic acid to the metal or suitable metal compound are used in the reaction mixture, such as about 10:1 or higher, about 15:1 or higher, about 20:1 or higher, about 25:1 or higher, about 30:1 or higher, or any range therebetween. A large molar excess of the phosphonic or pyrophosphonic acid relative to the metal or suitable metal compound may be used. For example, the molar ratio may be up to about 50:1, up to about 100:1, up to about 300:1, up to about 500:1, or any range therebetween. However, as would be understood, process efficiency may suffer at certain large molar excesses, e.g., product precipitation from the reaction mixture may be hindered. In many embodiments, the molar ratio ranges from about 4:1, from about 5:1, from about 6:1, from about 8:1 or from about 10:1 to about 100:1 or to about 50:1, such as from about 8:1, from about 12:1, from about 16:1 or from about 20:1 to about 50:1 or to about 40:1.

The reaction mixture is heated at a reaction temperature for an amount of time sufficient to produce the flame retardant product. As used herein, the step of "heating the reaction mixture at a reaction temperature for an amount of time sufficient to produce the phosphorus-containing flame retardant" and the like include, but are not limited to, embodiments where all or substantially all of component (b) of the reaction mixture—i.e., the solvent for the phosphonic or pyrophosphonic acid—boils off from the reaction mixture during the course of heating the reaction mixture to or at the reaction temperature. It is therefore understood that the "reaction mixture" described herein is still said to be heated at the reaction temperature even where all or substantially all of the solvent component (b) boils off during the course of heating the reaction mixture to or at the reaction temperature.

The reaction temperature for producing the phosphorus-containing flame retardant of the present disclosure according to the solvent method should be chosen to facilitate the formation of pyrophosphonic acid ligands in the reaction product. For a phosphonic acid, a reaction temperature of 105° C. or higher is used. Without being bound by a particular theory, the reaction temperature is chosen to produce pyrophosphonic acid ligands via dehydration reaction(s). In many embodiments, the metal or suitable metal compound and the phosphonic acid are reacted at temperatures higher than 105° C., such as about 115° C. or higher, about 120° C. or higher, about 130° C. or higher, about 140° C. or higher, about 150° C. or higher, about 160° C. or higher, about 170° C. or higher, about 180° C. or higher, about 200° C. or higher, about 220° C. or higher, about 240° C. or higher, about 260° C. or higher, about 280° C. or higher, or any range therebetween. The reaction temperature may be higher than those described above, such as up to about 350° C., up to about 400° C., or higher, but it typically does not meet or exceed the boiling temperature of the phosphonic acid. In many embodiments, the reaction temperature ranges from about 110° C. to about 350° C., from about 115° C. to about 300° C., from about 125° C. to about 280° C., or from about 140° C. to about 260° C. Through the dehydration reaction(s), water is formed, which can potentially lead to the undesirable reverse (hydrolysis) reaction. Thus, in some embodiments, the reaction system is designed to facilitate removal, such as the continuous removal, of water from the reaction mixture. For example, the reaction temperature may be chosen above the boiling temperature of the water to the extent necessary to boil off at least a portion or desired amount (e.g., a majority, substantially all, or all) of the water from the reaction. Additional means, such as a gas purge, vacuum, and/or other known means, may be used to facilitate removal of water from the reaction system.

For a pyrophosphonic acid, a reaction temperature of 20° C. or higher is used. As dehydration is unnecessary for pyrophosphonic acid, the reaction temperature can be lower than that described above for phosphonic acid. In many embodiments, the metal or suitable metal compound and the pyrophosphonic acid are reacted at temperatures higher than 20° C., such as about 40° C. or higher, about 60° C. or higher, about 80° C. or higher, about 100° C. or higher, about 140° C. or higher, about 180° C. or higher, about 200° C. or higher, or any range therebetween. The reaction temperature may be higher than those described above, such as up to about 300° C., up to about 400° C., or higher, but it typically does not meet or exceed the boiling temperature of the pyrophosphonic acid. In many embodiments, the reaction temperature ranges from about 25° C. to about 350° C., from about 25° C. to about 280° C., from about 30° C. to about 260° C., from about 40° C. to about 260° C., or from about 60° C. to about 240° C. Depending, for example, on the metal compound used to react with the pyrophosphonic acid, water may be generated from the reaction. As described above, in some embodiments, the reaction system is designed to facilitate removal, such as the continuous removal, of water from the reaction. For example, the reaction temperature may be chosen above the boiling temperature of the water to the extent necessary to boil off at least a portion or desired amount (e.g., a majority, substantially all, or all) of the water from the reaction. Additional means, such as a gas purge, vacuum, and/or other known means, may be used to facilitate removal of water from the reaction system.

The reaction may, but need not, be run under reduced pressure or vacuum.

In some embodiments of the solvent method, the solvent is a protic solvent (e.g., water) and the reaction system is designed to facilitate removal, such as the continuous removal, of the protic solvent during heating of the reaction mixture. For example, the reaction temperature may be chosen at or higher than the boiling temperature of the protic solvent to the extent necessary to boil off at least a portion or desired amount (e.g., a majority, substantially all, or all) of the protic solvent during heating of the reaction mixture In certain embodiments, the solvent is water and the reaction temperature is about 110° C. or higher, about 115° C. or higher, about 120° C. or higher, about 130° C. or higher, about 140° C. or higher, about 150° C. or higher, or about 160° C. or higher, such as the exemplary ranges described above. The reaction temperature may also be chosen at or higher than the melting temperature of the phosphonic or pyrophosphonic acid, such as further described herein.

Typically, the flame retardant product will precipitate from the reaction mixture such that the reaction is run for a time sufficient to achieve such precipitation. In general, the amount of time required to achieve at least substantial conversion to the flame retardant product, based on the metal or suitable metal compound in the reaction mixture, will depend on the reaction temperature, with higher temperatures generally resulting in shorter reaction times. Often, heating or reacting occurs at the reaction temperature for from about 0.1 to about 48 hours, such as from about 0.2 to about 36 hours, from about 0.5 to about 30 hours, from about 1 hour to about 24 hours, e.g., from about 1 hour to about 12 hours, from about 1 hour to about 8 hours, or from about 1 hour to about 5 hours, although other durations may be used.

The reaction mixture can be prepared in any manner suitable for combining or mixing (a) the unsubstituted or alkyl or aryl substituted phosphonic or pyrophoshonic acid, (b) the solvent for the phosphonic or pyrophosphonic acid, and (c) the metal or suitable metal compound. For example, the components may be combined simultaneously or at different times. In some embodiments, the metal or suitable metal compound (c) is added to a mixture, such as a solution, of the phosphonic or pyrophosphonic acid (a) and solvent (b). The metal or suitable metal compound (c) can be added to the reaction mixture all at once or in portions. Similarly, the phosphonic or pyrophosphonic acid (a), solvent (b), or mixture, such as a solution, of the phosphonic or pyrophosphonic acid (a) and solvent (b), can be added to the reaction mixture all at once or in portions.

In preparing the reaction mixture, the phosphonic or pyrophosphonic acid (a), the solvent (b), and the metal or suitable metal compound (c) may be combined at a preparation temperature below the reaction temperature. The reaction mixture is subsequently heated to the reaction temperature. A preparation temperature may be chosen, for example, to facilitate dissolution of the phosphonic or pyrophosphonic acid (a) in the solvent (b) or to otherwise form a homogenous liquid or solution of the phosphonic or pyrophosphonic acid (a) and the solvent (b). At the preparation temperature, and depending on the metal compound (c), the reaction mixture may form a solution, suspension or slurry, such as a homogenous or substantially homogenous suspension or slurry. In some embodiments, such as at higher preparation temperatures, the reaction mixture may form a solution. Often, near or at the reaction temperature the reaction mixture will present as a solution. In many embodiments, the preparation temperature is about 0° C. or higher, but often below 150° C., such as below 125° C., below 115° C., below 100° C., below 85° C., or below 65° C. For example, the preparation temperature may range from about 0° C. to about 65° C. or from about 15° C. to about 40° C. In some embodiments, the reaction mixture is prepared at room temperature (e.g., from about 15° C. to about 25° C.). In some embodiments, the solvent (b) is preheated to the preparation temperature and combined with the phosphonic or pyrophosphonic acid (a) and the metal or suitable metal compound (c). In some embodiments, a mixture of the solvent (b) and the phosphonic or pyrophosphonic acid (a) is preheated to the preparation temperature and is combined with the metal or suitable metal compound (c).

The reaction mixture may alternatively be prepared at the reaction temperature. That is, the reaction mixture is prepared by combining (a) the phosphonic or pyrophosphonic acid, (b) the solvent for the phosphonic or pyrophosphonic acid, and (c) the metal or suitable metal compound at the reaction temperature. For example, in some embodiments, preparing the reaction mixture comprises preheating a mixture of the solvent (b) and the phosphonic or pyrophosphonic acid (a) to the reaction temperature and combining with the metal or suitable metal compound (c).

In some embodiments where the reaction temperature is higher than the melting temperature of the phosphonic or pyrophosphonic acid and residual phosphonic or pyrophosphonic acid is present in the product reaction mixture after desired conversion, e.g., full or substantially full conversion, to the flame retardant product is achieved, the product reaction mixture is cooled to a temperature above or no less than the melting temperature of the residual phosphonic or pyrophosphonic acid to ensure that the phosphonic or pyrophosphonic acid remains in liquid form. This may be particularly useful in embodiments where an appreciable amount of the solvent for the phosphonic or pyrophosphonic acid (i.e., component (b)) boils off as a result of the heating such that remaining excess phosphonic or pyrophosphonic acid may have a greater tendency to come out of solution. The excess phosphonic or pyrophosphonic acid and the solvent if present in the product reaction mixture can be removed by filtration/washing and optionally recovered. The recovered excess phosphonic or pyrophosphonic acid and/or solvent may be recycled, e.g., back into the reactor in which a metal or suitable metal compound (c) reacts with the phosphonic or pyrophosphonic acid (a). After conversion to the reaction product, a solvent for the phosphonic or pyrophosphonic acid, which may but need not be the same as the solvent component (b), may optionally be added to dissolve or otherwise help remove excess phosphonic or pyrophosphonic acid. The phosphorus-containing flame retardant product is often isolated by filtration, optionally followed by additional work up (e.g., washing, drying, sieving, etc.). The resulting phosphorus-containing flame retardant product, which is generally in the form of a powder or small particles, is readily processable, i.e., without requiring or necessitating grinding, milling, or other such physical processing before use. It should be understood that producing the phosphorus-containing flame retardant product "directly" as a powder or small particles permits workup of the reaction product, such as isolating the flame retardant product (e.g., separating the flame retardant product from remaining solvent), which may include, e.g., processing the reaction product by filtering, sieving, washing, drying, and the like.

The solvent for the phosphonic or pyrophosphonic acid may be any solvent capable of dissolving the phosphonic or pyrophosphonic acid component, should be inert or substantially inert to the reaction between the phosphonic or pyrophosphonic acid and the metal or suitable metal compound, and may further be chosen taking into account other reaction parameters, e.g., the preparation and/or reaction temperature or the type of metal or suitable metal compound, such as to prepare a homogenous or substantially homogenous reaction mixture. In some embodiments, the solvent may be a combination of solvents for the phosphonic or pyrophosphonic acid. Often, the phosphonic or pyrophosphonic acid is substantially or completely dissolved in the solvent. For example, the phosphonic or pyrophosphonic acid and the solvent may form a solution. In some embodiments, the phosphonic or pyrophosphonic acid may be partially dissolved and partially suspended or dispersed in the solvent. The type of solvent, the amount of solvent relative to the phosphonic or pyrophosphonic acid, and the mixing conditions can be chosen to achieve the desired level of dissolution of the phosphonic acid, such as to obtain a high concentration of phosphonic or pyrophosphonic acid in the mixture while maintaining the phosphonic or pyrophosphonic acid in solution. Often, the ratio of the acid to the solvent ranges from about 10:1 to 1:10, about 5:1 to 1:5, or about 3:1 to 1:3, by weight. In some embodiments where the acid is partially dissolved and partially suspended or dispersed in the solvent, the preparation temperature or reaction temperature may be selected at or higher than the melting temperature of the acid to liquefy the acid which is suspended or dispersed in the solvent.

As described above, depending on the reaction temperature and the boiling temperature of the solvent for the phosphonic or pyrophosphonic acid, at least a portion of the solvent may boil off from the reaction mixture while heating to or at the reaction temperature. In some embodiments, all, substantially all, or at least a majority of the solvent boils off from the reaction mixture during heating. The solvent may be high-boiling (e.g., sulfolane or dimethyl sulfoxide (DMSO)) or low-boiling (e.g., chloroform or tetrahydrofuran (THF)). For example, in some embodiments, the solvent boils at a temperature at or below the reaction temperature such that at least a portion of the solvent boils off during heating of the reaction mixture, e.g., where all, substantially all, or a majority of the solvent boils off. The reaction temperature may be selected at or higher than the melting temperature of the phosphonic or pyrophosphonic acid to ensure that the same remains in liquid form as the solvent boils off. In this way, use of a larger excess of phosphonic or pyrophosphonic acid in the reaction mixture may allow the phosphonic or pyrophosphonic acid to serve as both a reactant and a solvent for the reaction.

In still other embodiments, the solvent has a boiling temperature higher than the reaction temperature, ensuring it will remain in the product reaction mixture, from which the flame retardant product of the reaction can be isolated, as described herein. In some embodiments, the reaction temperature is selected below the melting temperature of the phosphonic or pyrophosphonic acid.

Suitable solvents may be organic or inorganic. Examples of suitable solvents for the phosphonic or pyrophosphonic acid include, but are not limited to, water, sulfones, sulfoxides, halogenated (e.g., chlorinated) hydrocarbons, aromatic hydrocarbons, and ethers. For example, in some embodiments, the solvent may be chosen from water, sulfolane, dimethylsulfone, tetrahydrofuran (THF), dimethoxyethane (DME), 1,4-dioxane, dimethyl sulfoxide (DMSO), 1,2-dichlorobenzene, chloroform, carbon tetrachloride, xylene and mesitylene. In some embodiments, the solvent comprises water. In some embodiments, the solvent comprises an aqueous solution. In some embodiments, the reaction mixture is an aqueous reaction mixture.

The solvent may be protic or aprotic. In many embodiments, the solvent for pyrophosphonic acid is an aprotic solvent.

In some embodiments, the solvent (b) comprises a sulfone of the formula $R_1R_2SO_2$, wherein $R_1$ and $R_2$ are independently chosen from $C_{1-6}$ hydrocarbon groups, e.g., $C_{1-3}$ hydrocarbon groups, or $R_1$ and $R_2$ taken together with S form a ring having 2, 3, 4, or 5 carbon atoms, which ring may be unsubstituted or $C_{1-3}$ alkyl-substituted. In some embodiments, $R_1$ and $R_2$ taken together with S form a di-, tri-, tetra-, or penta-methylene ring. In some embodiments, $R_1$ and $R_2$ are independently chosen from $C_{1-6}$ alkyl. In some embodiments, $R_1$ or $R_2$ is $C_{1-6}$ alkyl and the other is $C_{1-3}$ alkyl. In some embodiments, $R_1$ and $R_2$ are independently chosen from $C_{1-3}$ alkyl. The alkyl groups may be branched or straight-chained. In some embodiments, $R_1$ and $R_2$ are both methyl, both ethyl, or both propyl. In other embodiments, $R_1$ or $R_2$ is methyl and the other is ethyl or propyl. In other embodiments, $R_1$ or $R_2$ is ethyl and the other is propyl. In some embodiments, the sulfone is sulfolane.

The phosphonic acid may be represented by the following formula:

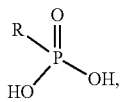

wherein R is H, alkyl, aryl, alkylaryl, or arylalkyl. In many embodiments, R is H, $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl. In some embodiments, said alkyl, aryl, alkylaryl, or arylalkyl are unsubstituted $C_{1-12}$ alkyl, $C_6$ aryl, $C_{7-10}$ alkylaryl, or $C_{7-10}$ arylalkyl, for example, $C_{1-6}$ alkyl, phenyl, or $C_{7-9}$ alkylaryl. In some embodiments, R is substituted or unsubstituted $C_{1-6}$ alkyl, $C_6$ aryl, $C_{7-10}$ alkylaryl, or $C_{7-12}$ arylalkyl, e.g., $C_{1-4}$ alkyl, $C_6$ aryl, $C_{7-9}$ alkylaryl, or $C_{7-10}$ arylalkyl. In many embodiments, R is unsubstituted $C_{1-12}$ alkyl, e.g., $C_{1-6}$ alkyl. In many embodiments, lower alkyl phosphonic acids are used, e.g., methyl-, ethyl-, propyl-, isopropyl-, butyl-, t-butyl- and the like.

The pyrophosphonic acid may be represented by the following formula:

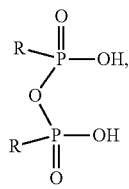

wherein R is as described above.

The process for producing the phosphorus-containing flame retardant may employ more than one phosphonic acid, more than one pyrophosphonic acid, or a combination of phosphonic and pyrophosphonic acids. In some embodiments, the phosphonic acid or pyrophosphonic acid is generated in situ. For example, preparing the reaction mixture may include preparing phosphonic or pyrophosphonic acid, such as by hydrolysis of higher oligomer phosphonic acid and/or cyclic phosphonic acid anhydride starting materials.

As used herein, "suitable metal compound" and the like refer to a compound of the formula $M_p^{(+)y}X_q$, where M is a metal that forms a cation of 2+ or 3+, and X is any anion that provides a charged balanced compound with metal M. Suitable examples for X include, but are not limited to, anions that, together with the metal M, form oxides, halides, alkoxides, hydroxides, carbonates, carboxylates, and phosphonates. The values for p and q provide a charge balanced metal compound, for example, alumina, $Al_2O_3$. In some embodiments, an unsubstituted metal, M, is used as described herein. Examples of suitable metals (M) include, but are not limited to, Al, Ga, Sb, Fe, Co, B, Bi, Mg, Ca, and Zn. In some embodiments, M is chosen from Al, Fe, Mg, Zn, and Ca.

Suitable metal compounds include, but are not limited to, compounds having a metal-oxygen bond, metal-nitrogen bond, metal-halogen bond, metal-hydrogen bond, metal-phosphorus bond, metal sulfur bond, metal boron bond, etc., for example, oxides, halides, alkoxides, hydroxides, carboxylates, carbonates, phosphonates, phosphinates, phosphonites, phosphates, phosphites, nitrates, nitrites, borates, hydrides, sulfonates, sulfates, sulfides, etc., of Al, Ga, Sb, Fe, Co, B, Bi, Mg, Ca, and Zn, for example, oxides, hydroxides, halides, or alkoxides of Al, Fe, Mg, Zn, or Ca.

In some embodiments, the metal, M, of the metal or suitable metal compound is aluminum or iron. In some embodiments, the suitable metal compound is chosen from halides, oxides, hydroxides, alkoxides, carbonates, carboxylates and phosphonates of aluminum. In some embodiments, the suitable metal compound is chosen from halides, oxides, hydroxides, and alkoxides of aluminum. In some embodiments, the suitable metal compound is chosen from alumina, aluminum trichloride, aluminum trihydroxide, aluminum isopropoxide, aluminum carbonate, and aluminum acetate. In other embodiments, the suitable metal compound is chosen from halides, oxides, alkoxides, carbonates, and acetates of iron. In some embodiments, the suitable metal compound is chosen from iron(III) oxide, iron(III) chloride, iron(III) isopropoxide, and iron(III) acetate.

In some embodiments, the suitable metal compound is a metal phosphonate salt. The metal in the metal phosphonate salt may be a metal, M, as described herein. In some embodiments, the metal phosphonate salt is prepared from the reaction of an initial metal compound and a phosphonic acid with a solvent (e.g., water) for the phosphonic acid. The initial metal compound may be a compound according to the suitable metal compound described herein. In some embodiments, the initial metal compound and the phosphonic acid are reacted at a temperature at or around room temperature or at a temperature ranging from about 0 to about 20° C. The resulting metal phosphonate salt may then be used as the suitable metal compound. For example, a phosphonic acid, e.g., one or more than one alkyl phosphonic acid as above, and a solvent (e.g., water) may be stirred to form a homogeneous solution. The solution may be cooled, e.g., from about 0 to about 20° C., and an initial metal compound, such as a metal oxide, halide, alkoxide, or hydroxide, is added to react with the phosphonic acid. A metal phosphonate salt is formed, which is then used as the suitable metal compound.

The preparation process may yield mixtures of phosphorus-containing flame retardant compounds, but in many embodiments the process produces the phosphorus-containing flame retardant product as one, or predominantly one, compound, with high conversion based on the metal or metal compound, such as at least 70%, 80%, 85%, 90%, 95%, 98% or higher conversion, or any range therebetween, as opposed to the mixtures of compounds that are obtained by the prior art processes involving heat treatment of metal phosphonate salts, such as disclosed in U.S. Pat. No. 9,745,449.

The reaction according to the solvent method proceeds generally as shown:

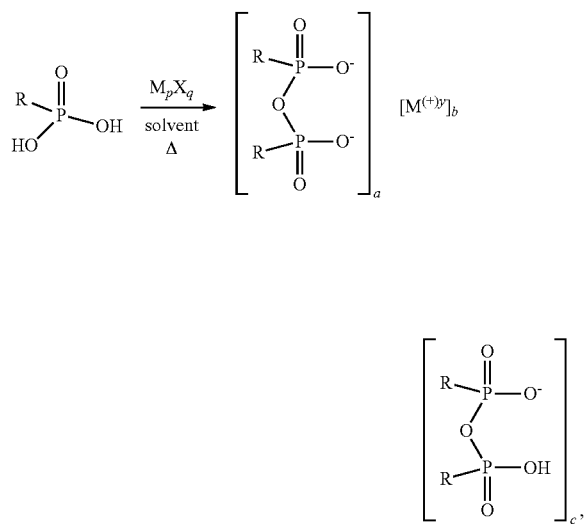

wherein M is a metal and y is 2 or 3, such that $M^{(+)y}$ is a metal cation where $(+)y$ represents the charge of the cation; X is an anionic ligand or ligands attached to the metal and the stoichiometry of M and X (i.e., p and q) provides a charged balanced metal compound; R is H, an alkyl, aryl, alkylaryl or arylalkyl (as described herein); a, b, and c represent the ratio of the components to which they correspond relative to one another in the reaction product, and satisfy the charge-balance equation $2(a)+c=b(y)$, and c is not zero. Often, a is 0, 1, or 2 (e.g., 0 or 1), b is from 1 to 4, e.g., 1 or 2, and c is 1 or 2, and the compound is charged balanced. In certain embodiments, R as shown herein is methyl, ethyl, propyl, isopropyl or butyl and M is Al, Fe, Zn or Ca. In further embodiments, X is an oxygen, hydroxy, alkoxy or halogen.

The general reaction scheme with a pyrophosphonic acid can be represented as

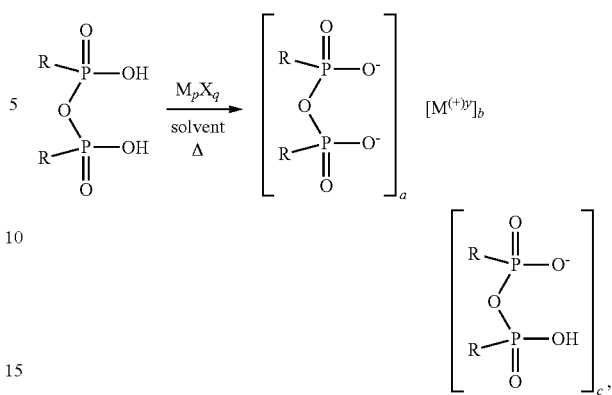

where R, M, X, p, q, y, a, b, and c are as described above.

As discussed above, as is common with inorganic coordination compounds, the formula for the reaction product is empirical or idealized such that the product may be a coordination polymer, complex salt, salt where certain atomic valences are shared, etc. In many embodiments, the reaction product above represents a monomer unit (i.e., coordination entity) of a coordination polymer, the extended coordination polymer structure thereby forming the phosphorus-containing flame retardant of the present disclosure.

In certain embodiments, y is 2 (i.e., $M^{(+)y}$ is a di-cationic metal), a is 0, b is 1, and c is 2. In certain embodiments, the di-cationic metal M is Mg, Ca, or Zn. In other embodiments, y is 3 (i.e., $M^{(+)y}$ is a tri-cationic metal), a is 1, b is 1, and c is 1. In certain embodiments, the tri-cationic metal M is chosen from Al, Ga, Sb, Fe, Co, B, and Bi. In certain embodiments, the tri-cationic metal M is Al, Fe, Ga, Sb, or B. In certain embodiments, M is aluminum (i.e., the reaction product is produced using aluminum or one or more aluminum compounds, such as those described herein) or iron (i.e., the reaction product is produced using iron or one or more iron compounds, such as those described herein).

In one example, a phosphorus-containing flame retardant compound is produced having the following empirical formula:

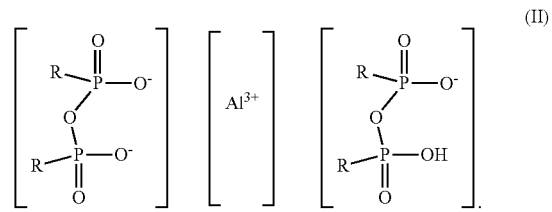

(II)

As shown herein, the absence of subscripts a, b and c in an empirical formula indicates that the subscripts are each 1, signifying a 1:1:1 ratio of the di-anionic pyrophosphonic acid ligand, metal atom, and mono-anionic pyrophosphonic acid ligand.

Often, the phosphorus-containing flame retardant compound, which in many embodiments is an extended coordination polymer as described herein, makes up all, substantially all, or at least a majority of the phosphorus-containing flame retardant product, such as at least 75%, 85%, 90%, 95%, 98%, or higher, or any range therebetween, by weight of the flame retardant product.

The product reaction mixture formed from the reaction, often presenting as a slurry, may be combined with an additional solvent, which may be the same or a different solvent than the solvent used in the reaction mixture. The additional solvent may, for example, be chosen from those described herein for the solvent component for the phosphonic or pyrophosphonic acid. The additional solvent/slurry mixture may be agitated as desired to break up any clumps that may have formed. The solid product may be isolated by filtration, optionally washed and dried, to yield the product in the form of a powder or small particles. In some cases, the product may be sieved to refine the particle size.

The reaction may optionally be facilitated with a seeding material. For example, use of a seeding material may reduce the time to achieve conversion to the phosphorus-containing flame retardant product and may lead to increased consistency in the product's physical characteristics. Thus, in some embodiments, the reaction mixture further comprises a seeding material. Often, the seeding material is added to the reaction mixture upon or after heating to the reaction temperature. In many embodiments, the seeding material is added before conversion to and/or precipitation of the flame retardant product occurs. In some embodiments, the seeding material comprises a phosphorus-containing flame retardant produced according to a method described herein. The seeding material may be selected or refined to have a desired particle size.

In some embodiments of the solvent method, the suitable metal compound is alumina, and the phosphorus-containing flame retardant product is produced as follows:

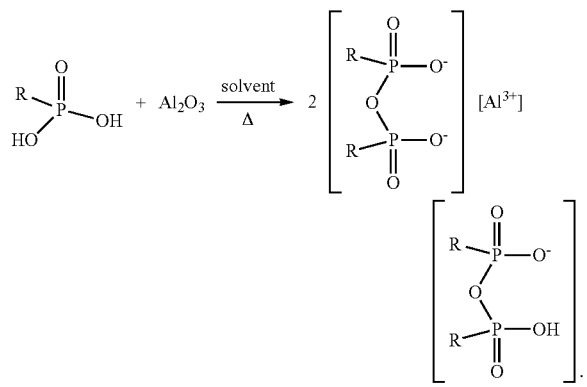

In one example, a reaction mixture comprising a phosphonic acid, such as a $C_1$-$C_{12}$ alkyl phosphonic acid (e.g., methyl, ethyl, propyl, iso-propyl, butyl or t-butyl phosphonic acid), a solvent for the phosphonic acid, such as water, and an oxide, hydroxide, halide, alkoxide, carbonate or carboxylate of Al, such as alumina, aluminum trichloride, aluminum trihydroxide, aluminum isopropoxide, aluminum carbonate or aluminum acetate, is heated to a reaction temperature as described herein, such as about 115° C. or higher, about 125° C. or higher, about 150° C. or higher, or about 165° C. or higher. Typically, a slurry forms as the reaction proceeds, and the solid phosphorus-containing flame retardant product may be isolated by filtration to yield the product in the form of a powder or small particles. Additional workup on the product reaction mixture may be performed prior to isolating the solid product, such as cooling the product reaction mixture above or no less than the melting point of excess phosphonic acid and combining with an additional solvent as described herein, e.g., water. The additional solvent/slurry mixture may be optionally agitated as described above. The solid phosphorus-containing flame retardant product may be isolated by filtration, optionally washed with additional solvent and dried, to yield the product in the form of a powder or small particles. The flame retardant product contains phosphorus and aluminum in a 4:1 ratio of phosphorus to aluminum according to the following empirical formula:

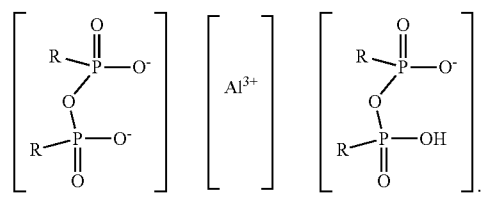

In a further example, the example described directly above is performed with iron or a suitable iron compound, such as halides, oxides, alkoxides, carbonates, or acetates of iron, e.g., iron(III) oxide, iron(III) chloride, iron(III) isopropoxide, or iron(III) acetate. The flame retardant product contains phosphorus and iron in a 4:1 ratio according to the following empirical formula:

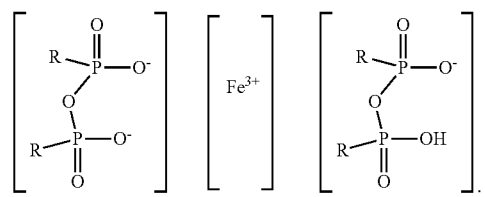

Often, the compound of the empirical formulas above (which in many embodiments is an extended coordination polymer as described herein) makes up all, substantially all, or at least a majority of the phosphorus-containing flame retardant product, such as at least 75%, 85%, 90%, 95%, 98%, or higher, or any range therebetween, by weight of the flame retardant product.

In a further embodiment, the suitable metal compound is a metal phosphonate salt of the following formula:

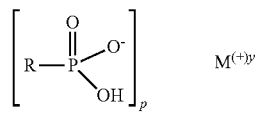

wherein R and M are as described above, p is 2 or 3 and y is 2 or 3 so that $M^{(+)y}$ is a metal cation where (+)y represents the charge formally assigned to the cation and the metal phosphonate salt is charge balanced (i.e., p=y). The metal phosphonate salt may be prepared according to methods known in the art.

In one example, a phosphonic acid, such as an alkyl phosphonic acid (e.g., methyl, ethyl, propyl, iso-propyl, butyl or t-butyl phosphonic acid) is combined with water (e.g., about 1:1 by weight) and is stirred and cooled to below room temperature (e.g., cooled to or below 10° C., such as about 0° C.). An initial metal compound is added to the mixture of phosphonic acid and water to form a metal phosphonate salt. The metal phosphonate salt is then used as the suitable metal compound to produce the phosphorus-containing flame retardant product in the form of a powder or small particles. In embodiments involving an aluminum phosphonate salt as the suitable metal compound, the flame retardant product contains phosphorus and aluminum in a 4:1 ratio of phosphorus to aluminum according to the following empirical formula:

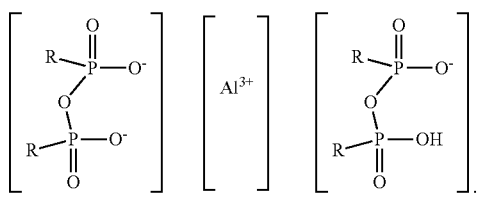

The compound of the empirical formula (which in many embodiments is an extended coordination polymer as described herein) typically makes up all, substantially all, or at least a majority of the flame retardant product, such as at least 75%, 85%, 90%, 95%, 98%, or higher, or any range therebetween, by weight of the flame retardant product.
Preparing the Phosphorus-Containing Flame Retardant Via the Molten State Method The phosphorus-containing flame retardant of empirical formula (I) may be prepared by reacting a metal or suitable metal compound with a stoichiometric excess of an unsubstituted or alkyl or aryl substituted phosphonic acid. The reaction temperature is 105° C. or higher, the phosphonic acid is in a molten state at the reaction temperature, and the molar ratio of the phosphonic acid to the metal or suitable metal compound in the reaction mixture is higher than 4:1. In the reaction, the metal is oxidized and may be represented in its corresponding cationic form by the formula $M^{(+)y}$ where M is a metal, (+)y represents the charge of the metal cation, and y is 2 or 3. The suitable metal compound may be represented by the formula $M_p^{(+)y}X_q$, where M is a metal, (+)y represents the charge of the metal cation, y is 2 or 3, X is an anion, and the values for p and q provide a charge balanced metal compound.

In another embodiment, the phosphorus-containing flame retardant of empirical formula (I) may be prepared by reacting a metal or suitable metal compound with a stoichiometric excess of an unsubstituted or alkyl or aryl substituted pyrophosphonic acid. The pyrophosphonic acid is in a molten state at the reaction temperature, and the molar ratio of the pyrophosphonic acid to the metal or suitable metal compound in the reaction mixture is higher than 2:1.

As used herein, "stoichiometric excess" of the unsubstituted or alkyl or aryl substituted phosphonic or pyrophosphonic acid relative to the metal or suitable metal compound refers to an amount of the phosphonic or pyrophosphonic acid which exceeds that stoichiometrically required for the reaction between the metal or suitable metal compound and the phosphonic or pyrophosphonic acid. The stoichiometric excess is typically represented by a molar ratio of the phosphonic or pyrophosphonic acid to the metal or suitable metal compound in the reaction mixture, as described herein.

The unsubstituted or alkyl or aryl substituted phosphonic or pyrophosphonic acid, used at a stoichiometric excess as described herein, acts as a reagent and solvent for the reaction. The reaction product typically forms as a slurry as the resulting phosphorus-containing flame retardant product precipitates from the reaction mixture. Excess phosphonic or pyrophosphonic acid remaining after the reaction can be removed along with any possible byproducts by filtration and/or washing, e.g., with water. In many embodiments, a substantially pure flame retardant material is produced, e.g., a flame retardant comprising essentially a single compound with flame retardant activity or essentially a mixture of active compounds. Conversion based on the metal or metal compound is typically high, and the product can be readily isolated and optionally further purified if desired.

Typically, the molar ratio of the phosphonic acid to the metal or suitable metal compound in the reaction mixture is 5:1 or higher, such as about 6:1 or higher, about 8:1 or higher, or about 10:1 or higher. Larger molar excesses of the phosphonic acid to the metal or suitable metal compound may be used in the reaction mixture, such as about 12:1 or higher, about 15:1 or higher, about 20:1 or higher, about 25:1 or higher, about 30:1 or higher, or any range therebetween. A large molar excess of the phosphonic acid relative to the metal or suitable metal compound may be used. For example, the molar ratio may be up to about 50:1, up to about 100:1, up to about 300:1, up to about 500:1, or any range therebetween. However, as would be understood, process efficiency may suffer at certain large molar excesses, e.g., product precipitation from the reaction mixture may be hindered. In many embodiments, the molar ratio ranges from about 8:1, from about 10:1, from about 12:1, or from about 16:1 to about 100:1 or to about 50:1, such as from about 10:1, from about 15:1, or from about 20:1 to about 50:1 or to about 40:1.

Typically, for pyrophosphonic acid, the molar ratio of the pyrophosphonic acid to the metal or suitable metal compound in the reaction mixture is 3:1 or higher, such as about 4:1 or higher, about 6:1 or higher, or about 8:1 or higher. Often larger molar excesses of the pyrophosphonic acid to the metal or suitable metal compound are used in the reaction mixture, such as about 10:1 or higher, about 12:1 or higher, about 15:1 or higher, about 18:1 or higher, about 20:1 or higher, or any range therebetween. A large molar excess of the pyrophosphonic acid relative to the metal or suitable metal compound may be used. For example, the molar ratio may be up to about 30:1, up to about 50:1, up to about 100:1, up to about 250:1, or any range therebetween. However, as would be understood, process efficiency may suffer at certain large molar excesses, e.g., product precipitation from the reaction mixture may be hindered. In many embodiments, the molar ratio ranges from about 4:1, from about 5:1, from about 6:1, or from about 8:1 to about 50:1 or to about 25:1, such as from about 5:1, from about 8:1, or from about 10:1 to about 25:1 or to about 20:1.

The reaction temperature for producing the phosphorus-containing flame retardant according to the molten state method should be chosen such that the phosphonic or pyrophosphonic acid is in a molten state at the reaction temperature. For example, phosphonic and pyrophosphonic acids (e.g., alkyl substituted phosphonic or pyrophosphonic acids) are often solid at room temperature (e.g., methyl phosphonic acid melts at about 105° C. and ethyl phosphonic acid melts at about 62° C.), and thus heating the phosphonic or pyrophosphonic acid to result in a liquefied physical state (i.e., molten state) is generally appropriate to form a consistent reaction mixture. As one skilled in the art will appreciate, the desired reaction temperature at which the phosphonic or pyrophosphonic acid is in a molten state may vary depending on the chosen reagents and thermodynamic conditions.

The reaction temperature should also be chosen to facilitate the formation of pyrophosphonic acid ligands in the reaction product. For a phosphonic acid, a reaction temperature of 105° C. or higher is used. Without being bound by a particular theory, the reaction temperature is chosen to produce pyrophosphonic acid ligands via dehydration reaction(s). In many embodiments, the metal or suitable metal compound and the phosphonic acid are reacted at temperatures higher than 105° C., such as about 115° C. or higher, about 120° C. or higher, about 130° C. or higher, about 140° C. or higher, about 150° C. or higher, about 160° C. or higher, about 170° C. or higher, about 180° C. or higher, about 200° C. or higher, about 220° C. or higher, about 240° C. or higher, about 260° C. or higher, about 280° C. or higher, or any range therebetween. The reaction temperature may be higher than those described above, such as up to about 350° C., up to about 400° C., or higher, but it typically does not meet or exceed the boiling temperature of the phosphonic acid. For example, the reaction temperature may range from about 150° C. to about 300° C., such as from about 150° C. to about 280° C., from about 160° C. to about 260° C., or from about 160° C. to about 240° C. In many embodiments, the reaction temperature ranges from about 110° C. to about 350° C., from about 115° C. to about 300° C., from about 125° C. to about 280° C., or from about 140° C. to about 260° C. Through the dehydration reaction(s), water is formed, which can potentially lead to the undesirable reverse (hydrolysis) reaction. Thus, in some embodiments, the reaction system is designed to facilitate removal, such as the continuous removal, of water from the reaction. For example, the reaction temperature may be chosen above the boiling temperature of the water to the extent necessary to boil off at least a portion or desired amount (e.g., a majority, substantially all, or all) of the water from the reaction. Additional means, such as a gas purge, vacuum, and/or other known means, may be used to facilitate removal of water from the reaction system.

As dehydration is unnecessary for pyrophosphonic acid, the reaction temperature for pyrophosphonic acid may be lower than that described above for phosphonic acid. Generally, the limiting criterion with respect to choosing a suitable reaction temperature when employing a pyrophosphonic acid is the requirement that the pyrophosphonic acid is in a molten state at the reaction temperature. Often, the metal or suitable metal compound and the pyrophosphonic acid are reacted at a temperature of 20° C. or higher. In many embodiments, the metal or suitable metal compound and the pyrophosphonic acid are reacted at temperatures higher than 20° C., such as about 40° C. or higher, about 60° C. or higher, about 80° C. or higher, about 100° C. or higher, about 140° C. or higher, about 180° C. or higher, about 200° C. or higher, or any range therebetween. The reaction temperature may be higher than those described above, such as up to about 300° C., up to about 400° C., or higher, but it typically does not meet or exceed the boiling temperature of the pyrophosphonic acid. In many embodiments, the reaction temperature ranges from about 25° C. to about 350° C., from about 25° C. to about 280° C., from about 30° C. to about 260° C., from about 40° C. to about 260° C., from about 60° C. to about 260° C., from about 80° C. to about 240° C., from about 100° C. to about 240° C., from about 110° C. to about 240° C., or from about 120° C. to about 240° C. Depending, for example, on the metal compound used to react with the pyrophosphonic acid, water may be generated from the reaction. As described above, in some embodiments, the reaction system is designed to facilitate removal, such as the continuous removal, of water from the reaction. For example, the reaction temperature may be chosen above the boiling temperature of the water to the extent necessary to boil off at least a portion or desired amount (e.g., a majority, substantially all, or all) of the water from the reaction. Additional means, such as a gas purge, vacuum, and/or other known means, may be used to facilitate removal of water from the reaction system.

The reaction may, but need not, be run under reduced pressure or vacuum.

Typically, as the reaction progresses, the product forms as a slurry as the resulting phosphorus-containing flame retardant product precipitates from the product reaction mixture. Thus, the reaction is typically run for a time sufficient to achieve such precipitation. In general, the amount of time required to achieve at least substantial conversion to the flame retardant product, based on the metal or suitable metal compound, will depend on the reaction temperature, with higher temperatures generally resulting in shorter reaction times. In many embodiments, the metal or suitable metal compound and the phosphonic or pyrophosphonic acid are heated at the reaction temperature for from about 0.1 to about 48 hours, such as from about 0.2 to about 36 hours, from about 0.5 to about 30 hours, from about 1 hour to about 24 hours, e.g., from about 1 hour to about 12 hours, from about 1 hour to about 8 hours, or from about 2 hours to about 5 hours, although other durations may be used.

The metal or suitable metal compound and the molar excess of the phosphonic or pyrophosphonic acid can be combined in any manner suitable to form the reaction mixture. For example, the phosphonic or pyrophosphonic acid and the metal or metal compound may be mixed (e.g., stirred) together, such as to form a homogenous reaction mixture. In some embodiments, the metal or suitable metal compound is added to the phosphonic or pyrophosphonic acid which has been preheated to the reaction temperature. In some embodiments, the phosphonic or pyrophosphonic acid is pre-heated and stirred upon melting, such as under a nitrogen atmosphere or reduced pressure/vacuum. In still further embodiments, the metal or metal compound is added as rapidly as possible without causing a large change in the reaction temperature due to the exothermic nature of the reaction. In some embodiments, the phosphonic or pyrophosphonic acid and the metal or suitable metal compound are combined without preheating the phosphonic acid, or without sufficient heating to liquefy the phosphonic or pyrophosphonic acid, and the components are subsequently heated to the reaction temperature. The full amount of metal or suitable metal compound or phosphonic or pyrophosphonic acid can be added to the reaction all at once or in portions. No additional solvents are needed, as the phosphonic or pyrophosphonic acid, used at a molar excess, acts as reagent and solvent, but additional solvent may be used if desired. In some embodiments, additional solvent is used when employing molar ratios of phosphonic or pyrophosphonic acid to the metal or suitable metal compound that are at or near the lower boundary of the molar ratios disclosed herein.

In some embodiments, after desired conversion, e.g., full or substantially full conversion, to the flame retardant product is achieved, the product reaction mixture is cooled to a temperature above or no less than the melting temperature of the excess phosphonic or pyrophosphonic acid to keep the excess phosphonic or pyrophosphonic acid in a liquefied state. The excess phosphonic or pyrophosphonic acid can be removed by filtration/washing and optionally recovered. The recovered excess phosphonic or pyrophosphonic acid may be recycled, e.g., back into the reactor in which a metal or suitable metal compound reacts with the phosphonic or pyrophosphonic acid. After conversion to the reaction product, a solvent, e.g., water, an alcohol, and/or another suitable (e.g., polar) liquid, may optionally be added to dissolve or otherwise help remove the excess phosphonic or pyrophosphonic acid. The phosphorus-containing flame retardant product is often isolated by filtration, optionally followed by additional work up (e.g., washing, drying, sieving, etc.). The resulting phosphorus-containing flame retardant product, which is generally in the form of a powder or small particles, is readily processable, i.e., without requiring or necessitating grinding, milling, or other such physical processing before use. It should be understood that producing the flame retardant material "directly" as a powder or small particles permits workup of the reaction product, such as isolating the flame retardant product (e.g., separating the flame retardant product from excess phosphonic or pyrophosphonic acid or remaining solvent), which may include, e.g., processing the reaction product by filtering, sieving, washing, drying, and the like. After the reaction, the resulting product reaction mixture, often a slurry, may be cooled to or just above the melting temperature of the excess phosphonic acid and the slurry may be combined with water. The water/slurry mixture may be agitated as necessary to break up any large clumps that might have formed. The solid product may be isolated by filtration, optionally washed with water and dried, to yield the product in the form of a powder or small particles. In some cases, the product may be sieved to refine the particle size.

The phosphonic acid or pyrophosphonic acid used to produce the phosphorus-containing flame retardant may be a phosphonic or pyrophosphonic acid as described above. The process may employ more than one phosphonic acid, more than one pyrophosphonic acid, or a combination of phosphonic and pyrophosphonic acids. In some embodiments, the phosphonic acid or pyrophosphonic acid is generated in situ. For example, preparing the reaction mixture may include preparing phosphonic or pyrophosphonic acid, such as by hydrolysis of higher oligomer phosphonic acid and/or cyclic phosphonic acid anhydride starting materials.

Suitable metals and metal compounds for the reaction are as described above.

The preparation process may yield mixtures of phosphorus-containing flame retardant compounds, but in many embodiments the process produces the phosphorus-containing flame retardant product as one, or predominantly one, compound, with high conversion based on the metal or metal compound, such as at least 70%, 80%, 85%, 90%, 95%, 98% or higher conversion, or any range therebetween, as opposed to the mixtures of compounds that are obtained by the prior art processes involving heat treatment of metal phosphonate salts, such as disclosed in U.S. Pat. No. 9,745,449.

The reaction according to the molten state method proceeds generally as shown:

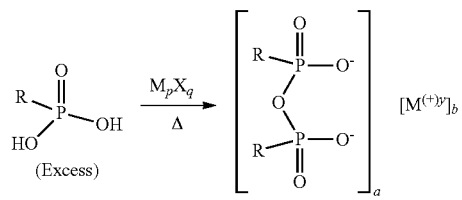

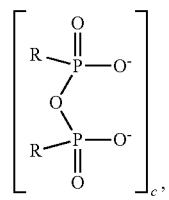

wherein M is a metal and y is 2 or 3, such that MM is a metal cation where (+)y represents the charge of the cation; X is an anionic ligand or ligands attached to the metal and the stoichiometry of M and X (i.e., p and q) provides a charged balanced metal compound; R is H, an alkyl, aryl, alkylaryl or arylalkyl (as described herein); a, b, and c represent the ratio of the components to which they correspond relative to one another in the reaction product, and satisfy the charge-balance equation $2(a)+c=b(y)$, and c is not zero. Often, a is 0, 1, or 2 (e.g., 0 or 1), b is from 1 to 4, e.g., 1 or 2, and c is 1 or 2, and the compound is charged balanced. In certain embodiments, R as shown herein is methyl, ethyl, propyl, isopropyl or butyl and M is Al, Fe, Zn or Ca. In further embodiments, X is an oxygen, hydroxy, alkoxy or halogen.

The general reaction scheme with a pyrophosphonic acid can be represented as

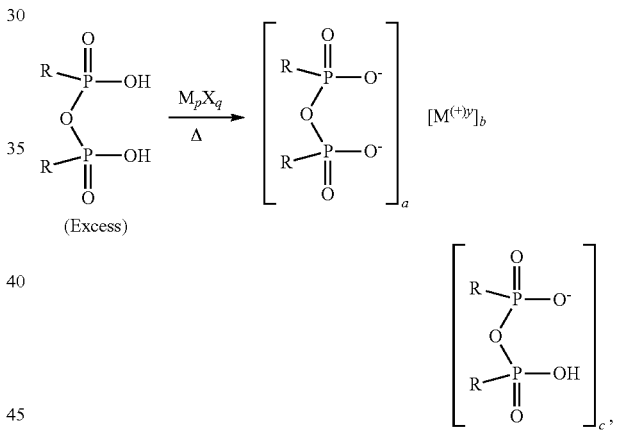

where R, M, X, p, q, y, a, b, and c are as described above.

As discussed above, as is common with inorganic coordination compounds, the formula for the reaction product is empirical or idealized such that the product may be a coordination polymer, complex salt, salt where certain atomic valences are shared, etc. In many embodiments, the reaction product above represents a monomer unit (i.e., coordination entity) of a coordination polymer, the extended coordination polymer structure thereby forming the phosphorus-containing flame retardant of the present disclosure.

In certain embodiments, y is 2 (i.e., $M^{(+)y}$ is a di-cationic metal), a is 0, b is 1, and c is 2. In certain embodiments, the di-cationic metal M is Mg, Ca, or Zn. In other embodiments, y is 3 (i.e., $M^{(+)y}$ is a tri-cationic metal), a is 1, b is 1, and c is 1. In certain embodiments, the tri-cationic metal M is chosen from Al, Ga, Sb, Fe, Co, B, and Bi. In certain embodiments, the tri-cationic metal M is Al, Fe, Ga, Sb, or B. In certain embodiments, M is aluminum (i.e., the reaction product is produced using aluminum or one or more aluminum compounds, such as those described herein) or iron (i.e., the reaction product is produced using iron or one or more iron compounds, such as those described herein).

In one example, a phosphorus-containing flame retardant compound is produced having the following empirical formula:

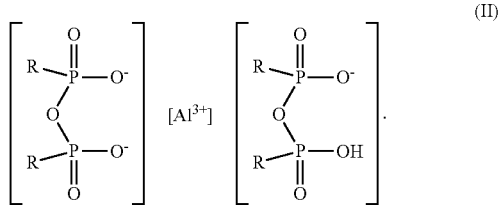

As described above, the absence of subscripts a, b and c in an empirical formula indicates that the subscripts are each 1, signifying a 1:1:1 ratio of the di-anionic pyrophosphonic acid ligand, metal atom, and mono-anionic pyrophosphonic acid ligand.

Often, the phosphorus-containing flame retardant compound, which in many embodiments is an extended coordination polymer as described herein, makes up all, substantially all, or at least a majority of the phosphorus-containing flame retardant product, such as at least 75%, 85%, 90%, 95%, 98%, or higher, or any range therebetween, by weight of the flame retardant product.

The product reaction mixture formed from the reaction, often presenting as a slurry, may be combined with a liquid (e.g., water) and agitated as desired to break up any clumps that may have formed. The solid product may be isolated by filtration, optionally washed and dried, to yield the product in the form of a powder or small particles. In some cases, the product may be sieved to refine the particle size.

The reaction may optionally be facilitated with a seeding material. For example, use of a seeding material may reduce the time to achieve conversion to the phosphorus-containing flame retardant product and may lead to increased consistency in the product's physical characteristics. Thus, in some embodiments, the reaction mixture further comprises a seeding material. Often, the seeding material is added to the reaction mixture upon or after heating to the reaction temperature. In some embodiments, the seeding material comprises a phosphorus-containing flame retardant produced according to a method described herein. The seeding material may be selected or refined to have a desired particle size.

In some embodiments of the molten state method, the suitable metal compound is alumina, and the flame retardant material is produced as follows:

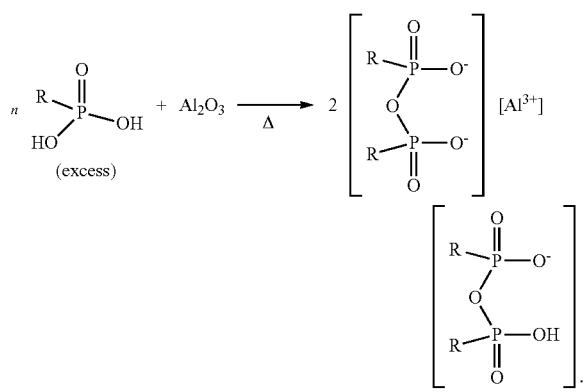

In one example, a phosphonic acid, such as a $C_1$-$C_{12}$ alkyl phosphonic acid (e.g., methyl, ethyl, propyl, iso-propyl, butyl or t-butyl phosphonic acid) is heated to or above its melting point, 105° C., such as to 115° C., 125° C., 140° C., 150° C., 160° C., 180° C., 200° C., 220° C., or 240° C. or higher, with stirring (e.g., under nitrogen) upon melting. An oxide, hydroxide, halide, alkoxide, carbonate or carboxylate of Al, such as alumina, aluminum trichloride, aluminum trihydroxide, aluminum isopropoxide, aluminum carbonate or aluminum acetate, is added with stirring at a stoichiometric excess of the phosphonic acid, such as at a molar ratio of phosphonic acid to the metal compound as described herein, e.g., 5:1 or higher, 10:1 or higher, or 15:1 or higher. Typically, a slurry forms as the reaction proceeds, and the solid flame retardant product may be isolated, such as by filtration, washing, etc. to yield the product in the form of a powder or small particles. Additional workup on the product reaction mixture may be performed prior to isolating the solid product, such as cooling the product reaction mixture above or no less than the melting point of the excess phosphonic acid and combining with a liquid, e.g., water, and optionally agitated as described above. The solid flame retardant product may be isolated by filtration, optionally washed with additional solvent and dried, to yield the product in the form of a powder or small particles. The flame retardant product contains phosphorus and aluminum in a 4:1 ratio according to the following empirical formula:

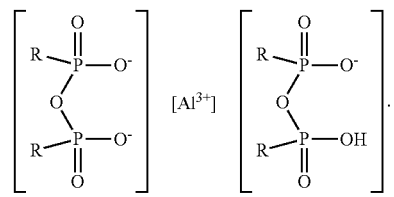

In a further example, the example described directly above is performed with iron or a suitable iron compound, such as halides, oxides, alkoxides, carbonates, or acetates of iron, e.g., iron(III) oxide, iron(III) chloride, iron(III) isopropoxide, or iron(III) acetate. The flame retardant product contains phosphorus and iron in a 4:1 ratio according to the following empirical formula:

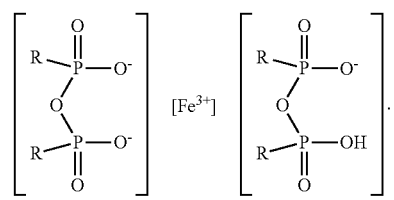

Often, the compound of the empirical formulas above (which in many embodiments is an extended coordination polymer as described herein) makes up all, substantially all, or at least a majority of the phosphorus-containing flame retardant product, such as at least 75%, 85%, 90%, 95%, 98%, or higher, or any range therebetween, by weight of the flame retardant product.

In a further example where the suitable metal compound is a metal phosphonate salt, the metal phosphonate salt is prepared by mixing a phosphonic acid, such as an alkyl phosphonic acid, e.g., methyl, ethyl, propyl, iso-propyl, butyl or t-butyl phosphonic acid, and a solvent (e.g., water) to form a homogeneous solution. For example, any convenient ratio of water to phosphonic acid may be used, e.g., 10:1 to 1:10 by weight, such as 5:1 to 1:5 by weight or 2:1 to 1:2 by weight. The solution may be cooled to, e.g., in the range from about 0 to about 20° C., and an initial metal compound, such as a metal oxide, halide, alkoxide, or hydroxide, is added to react with the phosphonic acid. A metal phosphonate salt is formed, which is then used as the suitable metal compound. For instance, a molar excess of phosphonic acid as described herein (such as at a 5:1 molar ratio of phosphonic acid relative to the metal phosphonate salt) is preheated to a molten state and is reacted with the metal phosphonate salt to form the phosphorus-containing flame retardant product. In embodiments involving an aluminum phosphonate salt as the suitable metal compound, the flame retardant product contains phosphorus and aluminum in a 4:1 ratio of phosphorus to aluminum according to the following empirical formula:

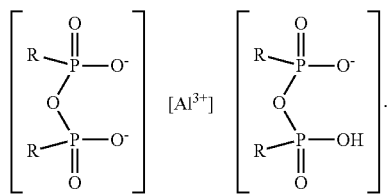

The compound of the empirical formula (which in many embodiments is an extended coordination polymer as described herein) typically makes up all, substantially all, or at least a majority of the flame retardant product, such as at least 75%, 85%, 90%, 95%, 98%, or higher, or any range therebetween, by weight of the flame retardant product.

Preparing the Flame Retardant and Stabilizer Additive Composition

The present invention is not limited by any particular method of mixing the components (A), (B), (C) and (D) of the presently disclosed flame retardant and stabilizer additive composition. For example, the at least one phosphorus-containing flame retardant (A) and the at least one epoxide (B), optionally with at least one flame retardant synergist and/or additional flame retardant (C) and/or one or more other stabilizers (D) may be mixed/blended by conventional mixing techniques, such as tumble mixing, convective mixing, fluidized bed mixing, high-shear mixing, etc. Conventional processing agents may also be used, e.g., dispersing agents, anti-static agents, binders, coupling agents, etc.

Preparing the Flame Retardant Thermoplastic Composition

The present invention is not limited by any particular method of blending the components of the presently disclosed flame retardant thermoplastic composition. Suitable compounding and blending techniques known in the art may be used. For example, one method comprises blending the thermoplastic polymer and additives in powder or granular form and melt-mixing the blend (e.g., using a twin-screw extruder). The thermoplastic polymer, flame retardant, stabilizer and other additives are typically pre-dried before melt-mixing. The extruded blend may be comminuted into granular pellets or other suitable shapes by standard techniques. Other melt-mixing process equipment such as a kneader mixer or bowl mixer can be used to compound the flame retardant additives and any additional ingredients with the thermoplastic polymer. In either case, a generally suitable machine temperature may range from about 200° to 330° C., depending on the specific type of thermoplastic selected.

The flame retardant thermoplastic compositions can be molded in any equipment suitable for such purpose, e.g., in an injection molding machine. After pelletizing, the granular pellets are typically re-dried before being molded in an injection molding machine suitable for such purpose. Often, the process temperature ranges from about 200° to 280° C., depending on the molding properties of the specific thermoplastic polymer, loading levels of the additives and/or reinforcement filler, and other factors like thickness and gate size of the mold cavity. Those skilled in the art will be able to make suitable adjustments in the molding process to accommodate the composition or tooling differences.

Further non-limiting disclosure is provided in the Examples that follow.

EXAMPLES

Example 1

Methylphosphonic acid (MPA) (3678.8 g, 38.3 mol, 30 eq, 75% aqueous solution) and alumina (130.2 g, 1.28 mol, 1 eq) were mixed at room temperature with limited exotherm observed (about 2° C. increase). The pot temperature was set to 165° C., with stirrer at 200 RPM under atmospheric pressure, nitrogen purge (4 L/min). When no distillate water was observed at the condenser, 1.0 g of seeding material, which was the flame retardant product produced from MPA and alumina as described herein, was optionally added. The reaction mixture was heated at 165° C. for 3 hours. The product reaction mixture containing a white slurry product was then cooled to about 130° C. and poured into 1.5 L of water in a beaker cooled in an ice water bath. The white slurry was then filtered off, washed by water (500 mL×3), and dried to yield fine crystals at 92% yield. The product had a 4:1 phosphorus to aluminum ratio (ICP Elemental Analysis) according to the following empirical formula:

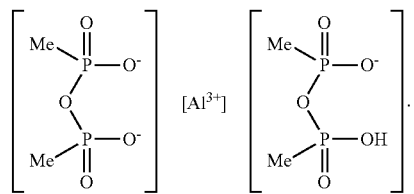

The product empirical formula above represents repeating monomer units (i.e., coordination entities) of a coordination polymer forming the pure crystalline product. Thermogravimetric analysis (TGA) of the product is shown in FIG. 1.

Example 2

A 1 L flask was charged with 800 mL xylenes and set up with a Dean-Stark trap. The solution was heated to 115° C. and methylphosphonic acid (MPA) (33.89 g, 0.35 mol) was added. The acid was allowed to dissolve and the temperature was increased such that the solution began to reflux. Alumina (4.01 g, 0.039 mol) was added in portions over 3 hours. The reflux was maintained at 142° C. overnight. The resulting solid product was isolated by filtration, washed with DMF (100 mL) and Et$_2$O (2×50 mL), and dried to yield a fine powder (18.86 g, 71% yield). The product had a 4:1 phosphorus to aluminum ratio according to the following empirical formula:

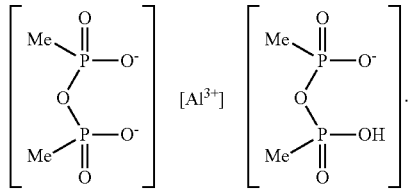

The product empirical formula above represents repeating monomer units (i.e., coordination entities) of a coordination polymer forming the pure crystalline product.

Example 3

Methylphosphonic acid (MPA) (2216 g, 23.1 mol, 15 eq, aqueous solution) and aluminum trihydroxide (120 g, 1.5 mol, 1 eq) were mixed at room temperature. The pot temperature was set to 165° C., with stirrer at 200 RPM under atmospheric pressure, nitrogen purge (4 L/min). When no distillate water was observed at the condenser, 1.0 g of seeding material, which was the flame retardant product produced from MPA and aluminum trihydroxide as described herein, was optionally added. The reaction mixture was heated at 165° C. for 3 hours. The product reaction mixture containing a white slurry product was then cooled to about 130° C. and poured into 1.5 L of water in a beaker cooled in an ice water bath. The white slurry was filtered off, washed by water (500 mL×3), and dried to yield fine crystals at approximately 100% yield. The product had a 4:1 phosphorus to aluminum ratio (ICP Elemental Analysis) according to the following empirical formula:

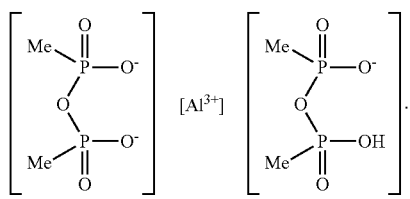

The product empirical formula above represents repeating monomer units (i.e., coordination entities) of a coordination polymer forming the pure crystalline product.

Example 4

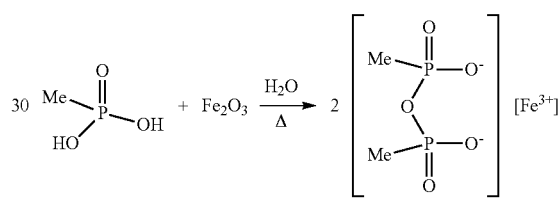

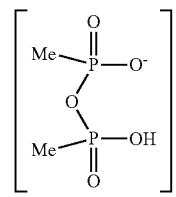

Methylphosphonic acid (MPA) (1412.6 g, 14.7 mol, 30 eq, 75% aqueous solution) and iron oxide (78.2 g, 0.49 mol, 1 eq) were mixed at room temperature. The pot temperature was set to 130° C. for about 12 hours, with stirrer at 250 RPM under atmospheric pressure, nitrogen purge (4 L/min). The reaction mixture was subsequently heated to 165° C. for 12 hours. The product reaction mixture containing an off-white slurry product was then cooled to about 130° C. and poured into 1.5 L of water in a beaker cooled in an ice water bath. The off-white slurry was filtered off, washed by water (500 mL×3), and dried to yield fine off-white color crystals at 92% yield. The product had a 4:1 phosphorus to iron ratio (ICP Elemental Analysis) according to the following empirical formula:

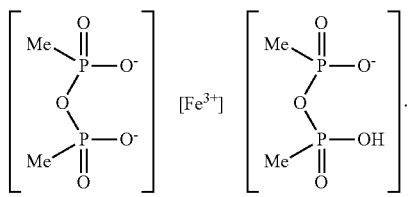

The product empirical formula above represents repeating monomer units (i.e., coordination entities) of a coordination polymer forming the pure crystalline product.

Example 5

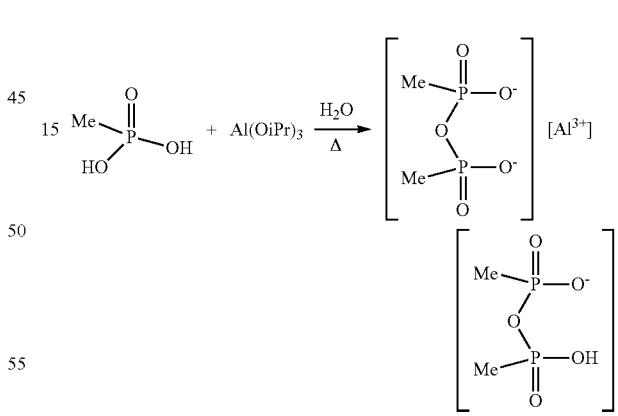

Methylphosphonic acid (MPA) (1727 g, 18.4 mol, 15 eq, 75% aqueous solution) was cooled to 5° C. in an ice water bath under nitrogen flow (1 L/min). Aluminum isopropoxide (250 g, 1.2 mol, 1 eq) was added in portions as the pot temperature was maintained below 10 degree C. The pot temperature was then set to 165° C., with stirrer at 250 RPM. At 165° C., 4.5 g of seeding material, which was the flame retardant product produced from MPA and aluminum isopropoxide as described herein, was optionally added, and the reaction mixture was kept at 165° C. for 3 hours. The product reaction mixture containing a white slurry product was then cooled to about 130° C. and poured into 1.5 L of water in a beaker cooled in an ice water bath. The white slurry was filtered off, washed by water (500 mL×3), and dried to yield fine crystals at 44% yield. The product had a 4:1 phosphorus to aluminum ratio (ICP Elemental Analysis) according to the following empirical formula:

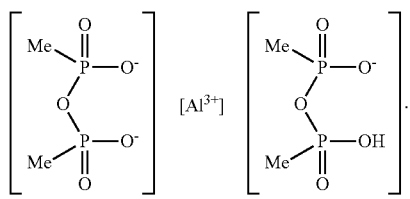

The product empirical formula above represents repeating monomer units (i.e., coordination entities) of a coordination polymer forming the pure crystalline product.

Example 6

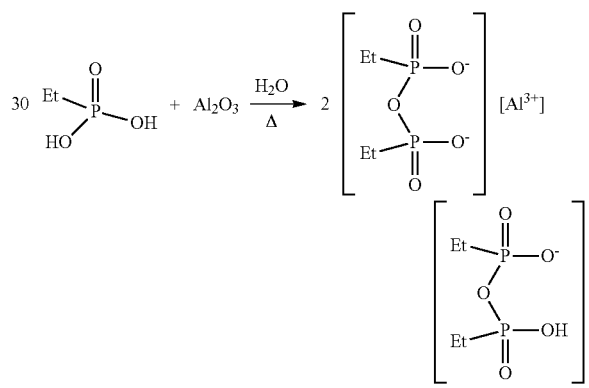

Ethylphosphonic acid (EPA) (55.0 g, 0.50 mol, 30 eq) and alumina (1.70 g, 17 mmol, 1 eq) were mixed at room temperature with 50 mL of water. The pot temperature was set to 165° C., with stirrer at 250 RPM under atmospheric pressure, nitrogen purge (4 L/min). The reaction mixture was heated at 165° C. for 3 hours. The product reaction mixture containing a white slurry product was then cooled to about 130° C. and poured into 100 mL of water in a beaker cooled in an ice water bath. The white slurry was filtered off, washed by water (50 mL×3), and dried to yield fine crystals at 76% yield. The product had a 4:1 phosphorus to aluminum ratio (ICP Elemental Analysis) according to the following empirical formula:

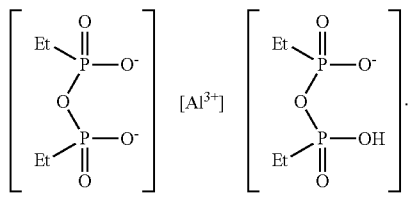

The product empirical formula above represents repeating monomer units (i.e., coordination entities) of a coordination polymer forming the pure crystalline product.

Example 7

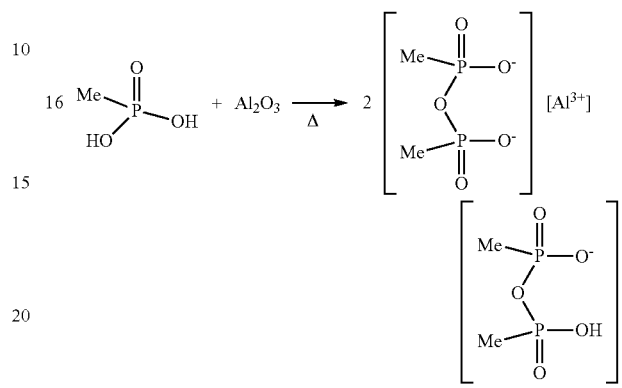

Figure 2:
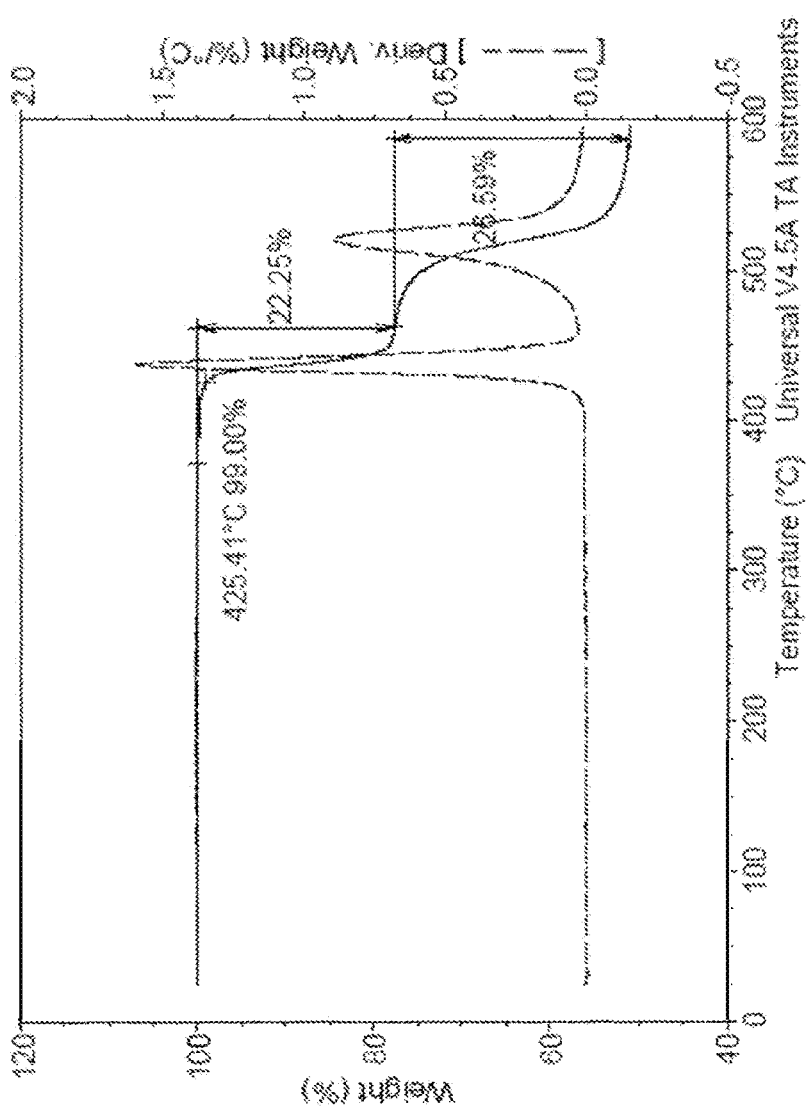
FIG. 2 shows the result of thermogravimetric analysis (TGA) of an exemplary phosphorus-containing flame retardant produced according to Example 7 of the present disclosure.

A three-neck 250 mL flask was charged with 114.6 g methylphosphonic acid, which was then heated. At 105° C. the methylphosphonic acid melts, and vigorous stirring was begun under a $N_2$ blanket. The methylphosphonic acid was heated to 240° C. and 7.78 g of alumina was added as quickly as possible without causing a large exotherm. The slurry was cooled until it was just above the melting point of the excess methyl phosphonic acid, ~110° C., and then added to 250 mL of $H_2O$ while ensuring that the rate of addition did not cause excessive steam formation. The resulting mixture was agitated to break up any large clumps that might have formed, the product was isolated by filtration, washed with an additional 750 mL of $H_2O$, and dried to yield 45.08 g of the product as fine colorless crystals at 87% yield. The product empirical formula above represents repeating monomer units (i.e., coordination entities) of a coordination polymer forming the pure crystalline product. Thermogravimetric analysis (TGA) of the product is shown in FIG. 2.

Example 8

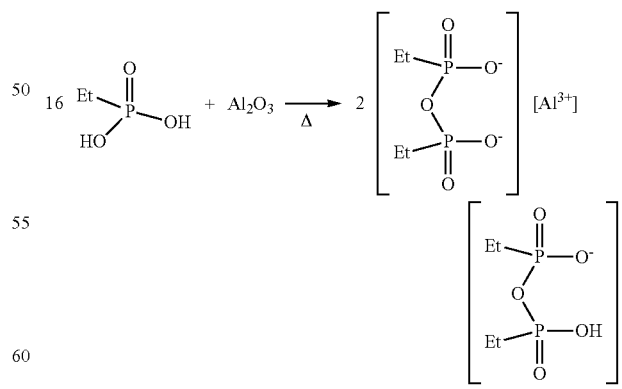

A three-neck 250 mL flask was charged with 149.8 g ethylphosphonic acid, which was heated to melting, 62° C. Vigorous stirring was begun under a $N_2$ blanket, the ethylphosphonic acid was heated to 240° C. and 6.9 g of alumina was added as quickly as possible without causing a large exotherm. The slurry was cooled to ~80° C., and then added to 250 mL of H$_2$O while ensuring that the rate of addition did not cause excessive steam formation. The resulting mixture was agitated to break up any large clumps that might have formed, the product was isolated by filtration, washed with an additional 750 mL of H$_2$O, and dried to yield 49.07 g of the product as fine colorless crystals at 84% yield. The product empirical formula above represents repeating monomer units (i.e., coordination entities) of a coordination polymer forming the pure crystalline product.

Example 9

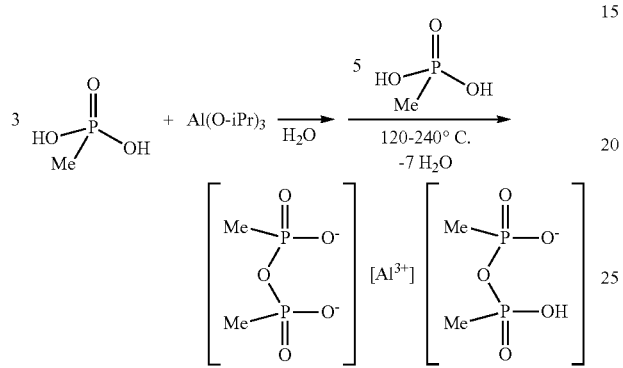

A resin kettle was charged with 83 g of methylphosphonic acid, which was heated to 120° C. An intermediate material prepared from 50 g. methyl phosphonic acid and 35.4 g. aluminum tris(isopropoxide) in the presence of water was added to the resin kettle as a syrup. The resulting solution contained a 5:1 molar ratio of methylphosphonic acid: aluminum methylphosphonic acid intermediate, which was heated to 240° C. with mechanical stirring. Stirred continued at 240° C. for about 30 min after a solid had formed. 500 mL of H$_2$O was added and the mixture was stirred for 16 h while a uniform slurry was made. As above, the product was isolated by filtration, washed with an additional 750 mL of H$_2$O, and dried to yield 64.3 g of the product as fine colorless crystals at 93% yield. The product empirical formula above represents repeating monomer units (i.e., coordination entities) of a coordination polymer forming the pure crystalline product.

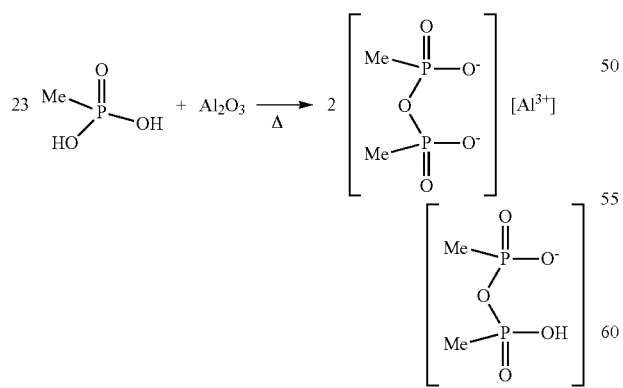

A three-neck 1 L flask was charged with 1305 g methylphosphonic acid, which was then heated. At 105° C. the methylphosphonic acid melted, and vigorous stirring was begun under vacuum. The methylphosphonic acid was heated to 180° C. and 61 g of alumina was added as quickly as possible without causing a large exotherm or excessive foaming. The slurry was cooled until it was just above the melting point of the excess methyl phosphonic acid, ~110° C., and then added to 1 L of H$_2$O while ensuring that the rate of addition did not cause excessive steam formation. The resulting mixture was agitated to break up any large clumps that might have formed, and the product was isolated by filtration, washed with an additional 1.5 L of H$_2$O, and dried to yield 408 g of the product as fine colorless crystals at 84% yield. The product empirical formula above represents repeating monomer units (i.e., coordination entities) of a coordination polymer forming the pure crystalline product.

The products from each of Examples 7-10 had a 4:1 P to Al ratio (ICP Elemental Analysis).

Example 11

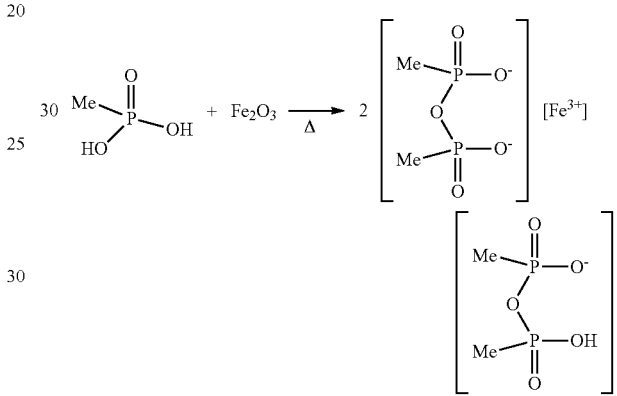

A 1 L reaction vessel was charged with 1412.6 g methylphosphonic acid, which was then heated to 165° C. under nitrogen purge (4 L/min) at 250 RPM stirring. 78.2 g of iron oxide was added in portions without causing a large exotherm. The reaction mixture was heated at 165° C. for about 24 hours. The product reaction mixture containing an off-white slurry product was then cooled to about 130° C. and poured into 1.5 L of water in a beaker cooled in an ice water bath. The product was isolated by filtration, washed with an additional 500 mL×3 of water, and dried to yield fine off-white color crystals at 83% yield. The product had a 4:1 phosphorus to iron ratio (ICP Elemental Analysis) according to the following empirical formula:

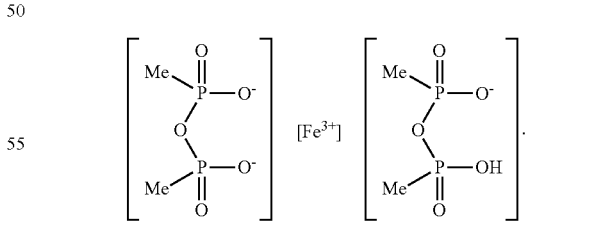

The product empirical formula above represents repeating monomer units (i.e., coordination entities) of a coordination polymer forming the pure crystalline product.

Example 12

The presently disclosed flame retardant and stabilizer combined was evaluated in polyamide-6,6 thermoplastic compositions. The ingredients are listed below and shown in Table 1, including the ratios of the blended components.

Thermoplastic Polymer:
Polyamide-6,6 (PolyNil® P-50/2 from Nilit)
Inorganic Filler:
Glass fiber (ChopVantage® 3540 from PPG)
Phosphorus-Containing Flame Retardant (Phos-FR):
Phos-FR produced according to Example 7 above
Flame Retardant Synergist:
Melam or Melon
Epoxide:
Polyglycidyl ether of ortho cresol novolac (Epon 164 from Hexion)

A twin screw extruder was used to compound the formulations shown in Table 1 at 265° C. An injection molder was used to prepare 0.8 mm (thickness) samples for each formulation at 255-270° C. and a mold temperature at 80° C. Each prepared formulation was evaluated for flame retardant activity under UL-94 testing and certain processing conditions.

TABLE 1

| | Formulation # | | | | |
|---|---|---|---|---|---|
| | 1 | 2 | 3 | 4 | 5 |
| PA 66 wt % | 70 | 46 | 46 | 45 | 45 |
| Glass wt % | 30 | 30 | 30 | 30 | 30 |
| Phos-FR (Ex. 7) wt % | — | 13 | 13 | 14 | 14 |
| Melam wt % | — | 10 | 10 | — | — |
| Melon wt % | — | — | — | 10 | 10 |
| Kemgard 981 wt % | — | 1.0 | 0.75 | — | — |
| Zinc Borate | — | — | — | 1.0 | 0.75 |
| Epon 164 wt % | — | — | 0.25 | — | 0.25 |
| UL 94 @ 1/32" (0.8 mm) | Fail | V-0 | V-0 | V-2 | V-0 |
| Injection molding | — | Low pressure | Medium pressure | Low to medium pressure | Medium pressure |
| Injection molding temperature | 265-270° C. | 255-260° C. | 265-270° C. | 265-270° C. | 265-270° C. |

As shown in Table 1, Formulations 2 and 3 each exhibited V-0 performance under UL-94 testing. Formulation 2 (without the epoxide) required use of a lower injection molding temperature as shown in Table 1 and resulted in a reduction in injection molding pressure. In contrast, Formulation 3, which included the epoxide compound, was able to be processed at standard injection molding temperature and each injection cycle was stable, thereby demonstrating the epoxide's stabilizing effect to mitigate polymer degradation during high temperature melt processing.

Additionally, Formulation 4 (without the epoxide) exhibited instability during injection molding processing and exhibited V-2 performance under UL-94 testing. In contrast, Formulation 5, which included the epoxide, was stable at each injection cycle at standard injection molding temperature and further exhibited a V-0 performance under UL-94 testing.

Although particular embodiments of the present invention have been illustrated and described, it will be apparent to those skilled in the art from consideration of the specification and practice of the present disclosure that various modifications and variations can be made without departing from the scope of the invention, as claimed. Thus, it is intended that the specification and examples be considered as exemplary only, with a true scope of the present invention being indicated by the following claims and their equivalents.

What is claimed is:

1. A flame retardant and stabilizer additive composition, for thermoplastic polymers, comprising
(A) at least one phosphorus-containing flame retardant of empirical formula (I):

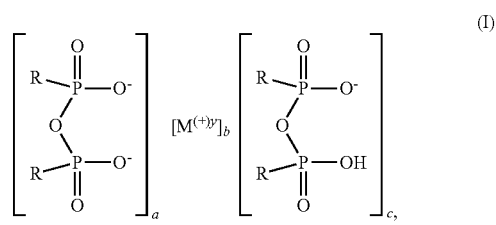

wherein R is H, an alkyl, aryl, alkylaryl, or arylalkyl group, M is a metal and y is 2 or 3, such that $M^{(+)y}$ is a metal cation where (+)y represents the charge formally assigned to the cation, a, b, and c represent the ratio of the components to which they correspond relative to one another in the compound, and satisfy the charge-balance equation 2(a)+c=b(y), and c is not zero, and
(B) at least one epoxide compound.

2. The flame retardant and stabilizer additive composition of claim 1, wherein in the empirical formula (I), a is 0, 1 or 2, b is from 1 to 4 and c is 1 or 2.

3. The flame retardant and stabilizer additive composition of claim 1, wherein y is 3, a is 1, b is 1 and c is 1.

4. The flame retardant and stabilizer additive composition of claim 3, wherein M is Al or Fe.

5. The flame retardant and stabilizer additive composition of claim 1, wherein in the empirical formula (I) R is H, $C_{1-12}$ alkyl, $C_{6-10}$ aryl, $C_{7-18}$ alkylaryl, or $C_{7-18}$ arylalkyl, wherein the alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl.

6. The flame retardant and stabilizer additive composition of claim 4, wherein R is chosen from methyl, ethyl, propyl, isopropyl, butyl, and t-butyl.

7. The flame retardant and stabilizer additive composition according to claim 1, wherein M is Al, y is 3, a is 1, b is 1 and c is 1.

8. The flame retardant and stabilizer additive composition of claim 7, wherein R is chosen from methyl and ethyl.

9. The flame retardant and stabilizer additive composition of claim 1 further comprising (C) at least one flame retardant synergist and/or additional flame retardant.

10. The flame retardant and stabilizer additive composition of claim 1, wherein the at least one epoxide compound has at least two epoxide groups.

11. The flame retardant and stabilizer additive composition of claim 10, wherein the epoxide compound is a polyglycidyl or poly(beta-methylglycidyl) ether.

12. The flame retardant and stabilizer additive composition of claim 10, wherein the epoxide compound is derived from a phenolic novolac.

13. The flame retardant and stabilizer additive composition of claim 12, wherein the phenolic novolac is chosen from cresol novolacs, bisphenol A novolacs, and bisphenol F novolacs.

14. The flame retardant and stabilizer additive composition of claim 10, wherein the epoxide compound is a phenolic novolac polyglycidyl ether.

15. The flame retardant and stabilizer additive composition of claim 14, wherein the phenolic novolac polyglycidyl ether is of the formula (III):

(III)

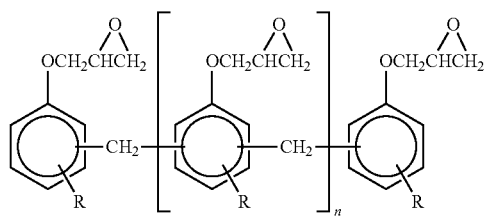

where R in formula (III) is independently chosen from the group consisting of hydrogen, halogen, alkyl, alkoxy, aryl, alkylaryl and aralkyl, and n is 0 to 1000.

16. The flame retardant and stabilizer additive composition of claim 15, wherein R in formula (III) is $C_1$-$C_4$ alkyl.

17. The flame retardant and stabilizer additive composition of claim 14, wherein the epoxide compound is a polyglycidyl ether of cresol novolac of the formula (IV):

(IV)

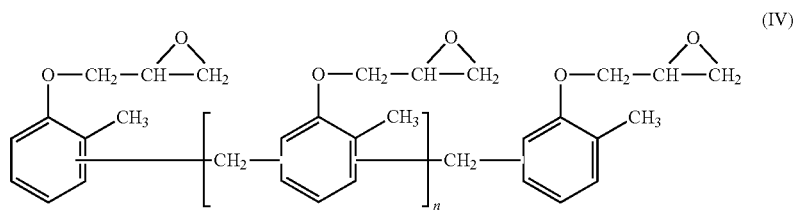

where n is from 0 to 100 and represents the average number.

18. The flame retardant and stabilizer additive composition of claim 11, wherein the epoxide compound is an oligomeric reaction product of bisphenol A with epichlorohydrin of formula (V):

(V)

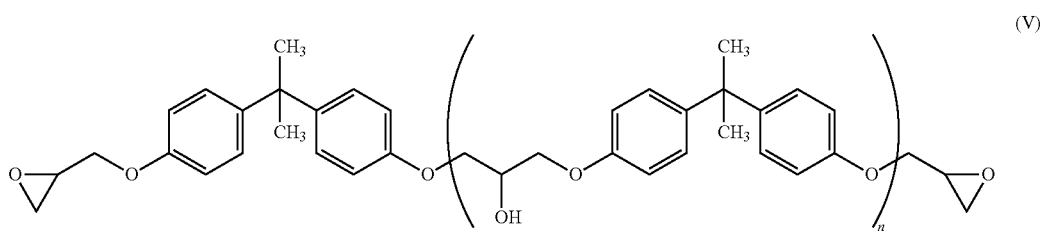

where a is from 0 to 100 and represents the average number.

19. The flame retardant and stabilizer additive composition of claim 1, further comprising (D) one or more other stabilizers.

20. A flame retardant thermoplastic composition comprising at least one thermoplastic polymer and the flame retardant and stabilizer additive composition according to claim 1.

* * * * *